US010594814B2

(12) United States Patent
Xu et al.

(10) Patent No.: US 10,594,814 B2
(45) Date of Patent: Mar. 17, 2020

(54) INFORMATION PUSHING METHOD, APPARATUS, AND SYSTEM

(71) Applicant: TENCENT TECHNOLOGY (SHENZHEN) COMPANY LIMITED, Shenzhen (CN)

(72) Inventors: Jiajie Xu, Shenzhen (CN); Runda Cai, Shenzhen (CN); Zhonghua Lai, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 192 days.

(21) Appl. No.: 15/176,271

(22) Filed: Jun. 8, 2016

(65) Prior Publication Data

US 2016/0285988 A1    Sep. 29, 2016

Related U.S. Application Data

(63) Continuation of application No. PCT/CN2015/070786, filed on Jan. 15, 2015.

(30) Foreign Application Priority Data

Jan. 15, 2014 (CN) .......................... 2014 1 0018445

(51) Int. Cl.
*G06F 15/16* (2006.01)
*H04L 29/08* (2006.01)
*H04L 12/58* (2006.01)

(52) U.S. Cl.
CPC .............. *H04L 67/26* (2013.01); *H04L 51/32* (2013.01); *H04L 67/36* (2013.01)

(58) Field of Classification Search
CPC ....... H04L 63/08; H04L 63/102; H04L 67/26; H04L 67/36; H04L 51/04; H04L 51/046; H04L 51/32
See application file for complete search history.

(56) References Cited

U.S. PATENT DOCUMENTS

2003/0130894 A1* 7/2003 Huettner ............ G06Q 30/0257
709/200
2011/0218884 A1* 9/2011 Kothari ................ G06Q 30/02
705/27.1
(Continued)

FOREIGN PATENT DOCUMENTS

CN        101110115 A      1/2008
CN        101895722 A     11/2010
(Continued)

OTHER PUBLICATIONS

Office Action in CN Application No. 201410018445.2 dated Jan. 29, 2016, 9 pages, with concise statement of relevance.
(Continued)

*Primary Examiner* — Suraj M Joshi
*Assistant Examiner* — Ayele F Woldemariam
(74) *Attorney, Agent, or Firm* — Morgan, Lewis & Bockius LLP

(57) ABSTRACT

The present disclosure discloses an information pushing method, apparatus, and system. The method includes: receiving at least one screening condition and to-be-pushed conversion association information that are sent by a social application client corresponding to an information providing account; obtaining at least one target pushing account from candidate pushing accounts through screening according to the at least one screening condition; encapsulating the conversion association information into a dedicated service message corresponding to the target pushing account; and pushing the dedicated service message to a social application client corresponding to the target pushing account. The present disclosure solves a problem that an effective acquisition rate of information is low in an information releasing method involved in the background of the present disclosure, and achieves an effect of greatly improving an effective (Continued)

acquisition rate of information by actively pushing conversion association information to some specific accounts.

13 Claims, 11 Drawing Sheets

(56) References Cited

U.S. PATENT DOCUMENTS

| | | | | |
|---|---|---|---|---|
| 2011/0238570 A1* | 9/2011 | Li | ............... | G06Q 20/102 705/40 |
| 2011/0307403 A1* | 12/2011 | Rostampour | .......... | G06Q 50/01 705/325 |
| 2012/0253948 A1* | 10/2012 | O'Bryan | ............ | G06Q 30/0251 705/14.71 |
| 2013/0117312 A1* | 5/2013 | Chen | ................ | G06F 17/30864 707/780 |
| 2013/0226710 A1* | 8/2013 | Plut | ....................... | G06Q 30/02 705/14.67 |

FOREIGN PATENT DOCUMENTS

| | | |
|---|---|---|
| CN | 101957857 A | 1/2011 |
| CN | 101997894 A | 3/2011 |
| CN | 102054240 A | 5/2011 |
| CN | 103150665 A | 6/2013 |
| CN | 103226782 A | 7/2013 |

OTHER PUBLICATIONS

Search Report in International Application No. PCT/CN2015/070786 dated Apr. 16, 2015, 2 pages.

International Preliminary Report on Patentability and Written Opinion in International Application No. PCT/CN2015/070786 dated Jul. 19, 2016, 6 pages.

* cited by examiner

INFORMATION PUSHING METHOD, APPARATUS, AND SYSTEM

CROSS-REFERENCE TO RELATED APPLICATIONS

This is a continuation of International Patent Application No. PCT/CN2015/070786 filed Jan. 15, 2015, which claims the priority benefit of Chinese Patent Application No. 201410018445.2 filed Jan. 15, 2014, the entire respective disclosures of which are incorporated herein by reference.

FIELD OF THE DISCLOSURE

The present disclosure relates to the field of Internet, and in particular, to an information pushing method, apparatus, and system.

BACKGROUND OF THE DISCLOSURE

With the development of network technologies, more Internet users complete information releasing and spreading through the network.

In a common information releasing method, an information releaser releases information to Internet through the webpage. Specifically, the information releaser creates a webpage, adds to-be-released information to the webpage, and releases the webpage including the to-be-released information to the Internet. The Internet user may access the webpage by using a webpage address or some preset links, and acquires related information from the webpage.

On one hand, in the foregoing information releasing method, information is released for all Internet users, causing that some Internet users not expecting to receive the released information views the information unintentionally when browsing webpages; on the other hand, the Internet users need to open the webpage actively to acquire the released information, causing that some Internet users really needing to receive the released information miss the information due to various reasons. Therefore, as can be seen, an effective acquisition rate of information released by using the foregoing information releasing method is low.

SUMMARY

In order to solve a problem that an effective acquisition rate of information is low in an information releasing method involved in the background of the present disclosure, embodiments of the present invention provide an information pushing method, apparatus, and system. The technical solutions are as follows:

A first aspect provides an information pushing method, including:

acquiring, by a social application client corresponding to an information providing account, at least one screening condition, and sending the at least one screening condition and to-be-pushed conversion association information to a server;

obtaining, by the server, at least one target pushing account from candidate pushing accounts through screening according to the received at least one screening condition, encapsulating the conversion association information into a dedicated service message corresponding to the target pushing account, and pushing the dedicated service message to a social application client corresponding to the target pushing account; and reading, by the social application client corresponding to the target pushing account, the conversion association information included in the received dedicated service message, generating a conversion prompt identifier corresponding to the conversion association information, displaying the conversion prompt identifier on an interface that is used for guiding a user of the social application client corresponding to the target pushing account to perform goods conversion, and after a triggering signal acting on the conversion prompt identifier is received, displaying the conversion association information corresponding to the conversion prompt identifier.

A second aspect provides an information pushing method, where the method is used in a server, and the method includes:

receiving at least one screening condition and to-be-pushed conversion association information that are sent by a social application client corresponding to an information providing account;

obtaining at least one target pushing account from candidate pushing accounts through screening according to the at least one screening condition;

encapsulating the conversion association information into a dedicated service message corresponding to the target pushing account; and pushing the dedicated service message to a social application client corresponding to the target pushing account, so that the social application client corresponding to the target pushing account reads the conversion association information included in the dedicated service message, generates a conversion prompt identifier corresponding to the conversion association information, displays the conversion prompt identifier on an interface that is used for guiding a user of the social application client corresponding to the target pushing account to perform goods conversion, and after a triggering signal acting on the conversion prompt identifier is received, displays the conversion association information corresponding to the conversion prompt identifier.

A third aspect provides an information pushing method, where the method is used in a social application client corresponding to an information providing account, and the method includes:

acquiring at least one screening condition; and sending the at least one screening condition and to-be-pushed conversion association information to a server, so that the server obtains at least one target pushing account from candidate pushing accounts through screening according to the at least one screening condition, and after the conversion association information is encapsulated into a dedicated service message corresponding to the target pushing account, pushes the dedicated service message to a social application client corresponding to the target pushing account.

A fourth aspect provides an information pushing method, where the method is used in a social application client corresponding to a target pushing account, and the method includes:

receiving a dedicated service message pushed by a server, where the dedicated service message is sent by the server to the social application client corresponding to the target pushing account after the server receives at least one screening condition and to-be-pushed conversion association information that are sent by a social application client corresponding to an information providing account, obtains at least one target pushing account from candidate pushing accounts through screening according to the at least one screening condition, and encapsulates the conversion association information into the dedicated service message corresponding to the target pushing account;

reading the conversion association information included in the dedicated service message;

generating a conversion prompt identifier corresponding to the conversion association information;

displaying the conversion prompt identifier on an interface that is used for guiding a user of the social application client corresponding to the target pushing account to perform goods conversion; and after a triggering signal acting on the conversion prompt identifier is received, displaying the conversion association information corresponding to the conversion prompt identifier.

A fifth aspect provides an information pushing system, including:

a social application client corresponding to an information providing account, configured to acquire at least one screening condition, and send the at least one screening condition and to-be-pushed conversion association information to a server;

the server, configured to obtain at least one target pushing account from candidate pushing accounts through screening according to the received at least one screening condition, encapsulate the conversion association information into a dedicated service message corresponding to the target pushing account, and push the dedicated service message to a social application client corresponding to the target pushing account; and the social application client corresponding to the target pushing account, configured to read the conversion association information included in the received dedicated service message, generate a conversion prompt identifier corresponding to the conversion association information, display the conversion prompt identifier on an interface that is used for guiding a user of the social application client corresponding to the target pushing account to perform goods conversion, and after a triggering signal acting on the conversion prompt identifier is received, display the conversion association information corresponding to the conversion prompt identifier.

A sixth aspect provides an information pushing apparatus, where the apparatus is used in a server and the apparatus includes:

an information receiving module, configured to receive at least one screening condition and to-be-pushed conversion association information that are sent by a social application client corresponding to an information providing account;

an account screening module, configured to obtain at least one target pushing account from candidate pushing accounts through screening according to the at least one screening condition;

an information encapsulation module, configured to encapsulate the conversion association information into a dedicated service message corresponding to the target pushing account; and a message pushing module, configured to push the dedicated service message to a social application client corresponding to the target pushing account, so that the social application client corresponding to the target pushing account reads the conversion association information included in the dedicated service message, generates a conversion prompt identifier corresponding to the conversion association information, displays the conversion prompt identifier on an interface that is used for guiding a user of the social application client corresponding to the target pushing account to perform goods conversion, and after a triggering signal acting on the conversion prompt identifier is received, displays the conversion association information corresponding to the conversion prompt identifier.

A seventh aspect provides an information pushing apparatus, where the apparatus is used in a social application client corresponding to an information providing account and the apparatus includes:

a condition acquisition module, configured to acquire at least one screening condition; and an information sending module, configured to send the at least one screening condition and to-be-pushed conversion association information to a server, so that the server obtains at least one target pushing account from candidate pushing accounts through screening according to the at least one screening condition, and after the conversion association information is encapsulated into a dedicated service message corresponding to the target pushing account, pushes the dedicated service message to a social application client corresponding to the target pushing account.

An eighth aspect provides an information pushing apparatus, where the apparatus is used in a social application client corresponding to a target pushing account and the apparatus includes:

a conversion receiving module, configured to receive a dedicated service message pushed by a server, where the dedicated service message is sent by the server to the social application client corresponding to the target pushing account after the server receives at least one screening condition and to-be-pushed conversion association information that are sent by a social application client corresponding to an information providing account, obtains at least one target pushing account from candidate pushing accounts through screening according to the at least one screening condition, and encapsulates the conversion association information into the dedicated service message corresponding to the target pushing account;

an information reading module, configured to read the conversion association information included in the dedicated service message;

a prompt generation module, configured to generate a conversion prompt identifier corresponding to the conversion association information;

a prompt display module, configured to display the conversion prompt identifier on an interface that is used for guiding a user of the social application client corresponding to the target pushing account to perform goods conversion; and a conversion display module, configured to: after a triggering signal acting on the conversion prompt identifier is received, display the conversion association information corresponding to the conversion prompt identifier.

The technical solutions provided in the embodiments of the present invention bring about the following beneficial effects:

After receiving at least one screening condition and to-be-pushed conversion association information that are sent by a social application client corresponding to an information providing account, a server obtains at least one target pushing account from candidate pushing accounts through screening according to the at least one screening condition, and after the conversion association information is encapsulated into a dedicated service message corresponding to the target pushing account, pushes the dedicated service message to a social application client corresponding to the target pushing account; therefore, on one hand, compared with that in the information releasing method involved in the background of the present disclosure, information is released for all Internet users, the embodiments of the present invention can effectively control the number and quality of the target pushing accounts by using a screening condition, so that the information is pushed in a targeted and intentional manner; on the other hand, compared with that in the information releasing method involved in the background of the present disclosure, an Internet user needs to open a webpage actively to view information, in the embodiments of the present invention, information is pushed to the target pushing account actively, thereby avoiding that some users really needing to receive the information miss the information; therefore, the embodiments of the present invention solve a problem that an effective acquisition rate of information is low in the information releasing method involved in the background of the present disclosure, and achieve an effect of greatly improving an effective acquisition rate of information by actively pushing conversion association information to some specific accounts.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the technical solutions, and advantages of the present disclosure clearer, the following further describes the embodiments of the present invention in detail with reference to the accompanying drawings.

Figure 1:
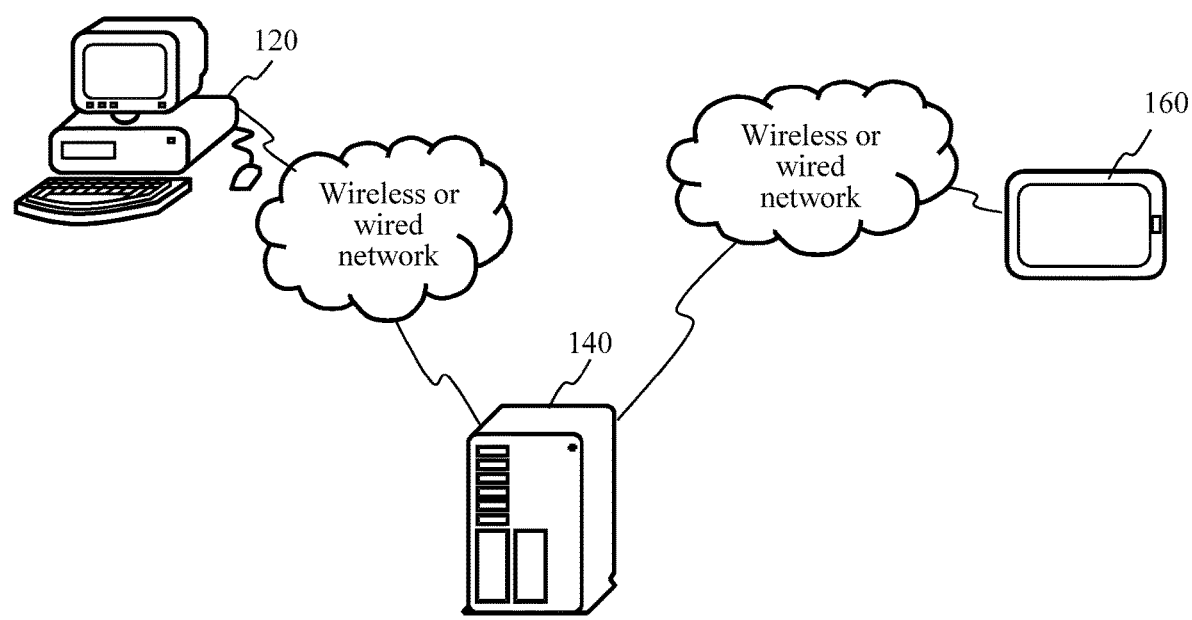
FIG. 1 is a schematic structural diagram of an implementation environment involved in information pushing methods according to embodiments of the present invention.

Refer to FIG. 1, which is a schematic structural diagram of an implementation environment involved in information pushing methods according to embodiments of the present invention. The implementation environment includes an information providing terminal 120, a server 140, and a target terminal 160.

The information providing terminal 120 is a terminal used by an information sender, the information providing terminal 120 may be an electronic device running a social application client corresponding to an information providing account, where the electronic device may be a mobile phone, a tablet computer, an ebook reader, a moving picture experts group audio layer III (MP3) player, a moving picture experts group audio layer IV (MP4) player, a laptop computer, or a desktop computer, or the like.

The information providing terminal 120 is connected to the server 140 through a wireless network or a wired network.

The server 140 may be one server, or a server cluster formed by a plurality of servers, or a cloud computing service center.

The server 140 is connected to the target terminal 160 through a wireless network or a wired network.

The target terminal 160 is a terminal used by an information receiver, and the target terminal 160 may be an electronic device running a social application client corresponding to a target pushing account, where the electronic device may be a mobile phone, a tablet computer, an ebook reader, an MP3 player, an MP4 player, a laptop computer, or a desktop computer, or the like.

The social application clients running in the information providing terminal 120 and the target terminal 160 include a social website client, a Microblog client, an instant messaging client, and the like. Meanwhile, the social application client and the server that are involved in the implementation environment provide a conversion function based on real goods or virtual goods of Internet, such as online shopping.

Figure 2:
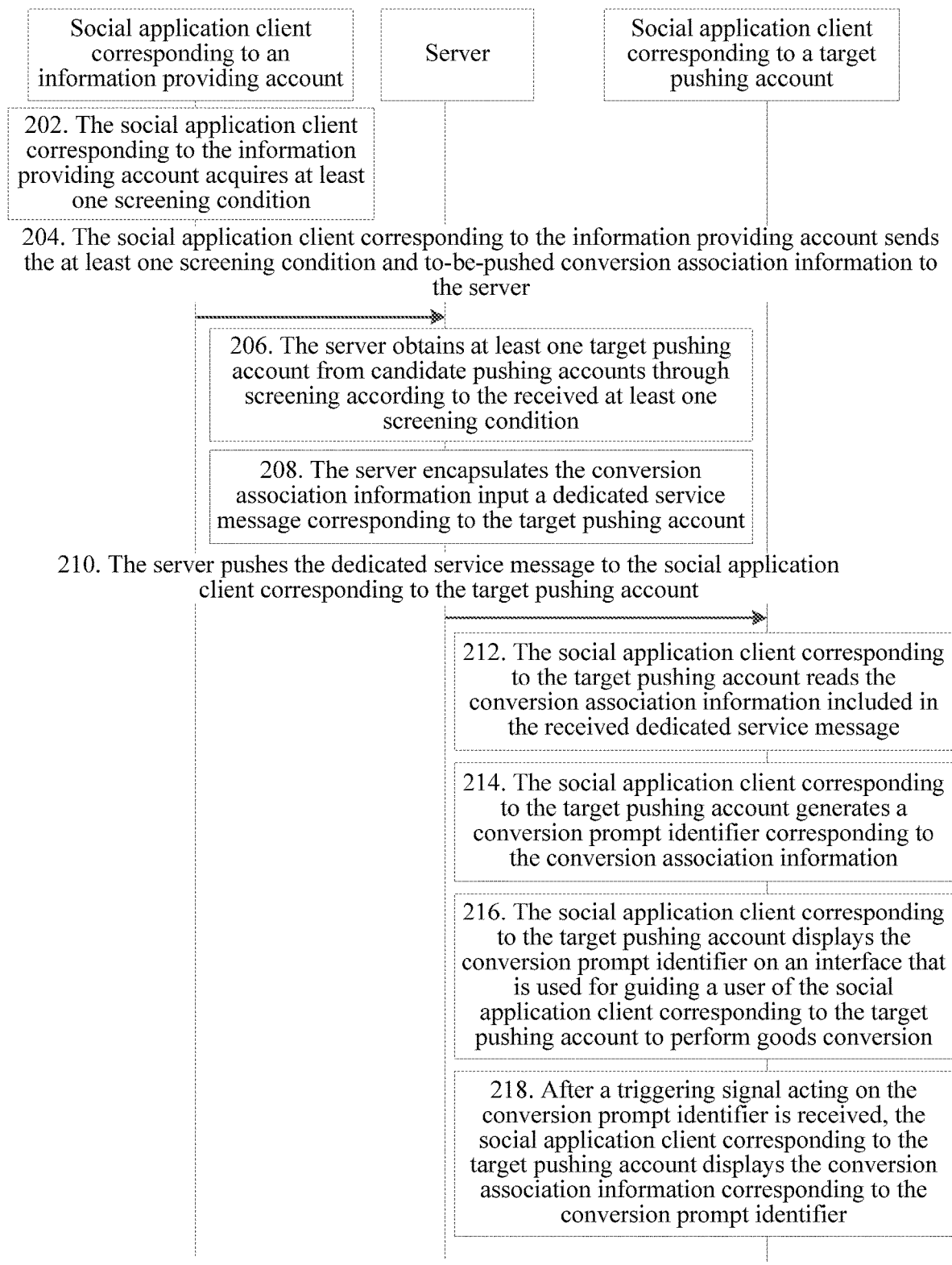
FIG. 2 is a flowchart of an information pushing method according to an embodiment of the present invention.

Refer to FIG. 2, which is a flowchart of an information pushing method according to an embodiment of the present invention. This embodiment makes description by using an example in which the information pushing method is used in the implementation environment shown in FIG. 1. The information pushing method may include the following steps:

Step 202: A social application client corresponding to an information providing account acquires at least one screening condition.

Step 204: The social application client corresponding to the information providing account sends at least one screening condition and to-be-pushed conversion association information to a server.

Step 206: The server obtains at least one target pushing account from candidate pushing accounts through screening according to the at least one screening condition.

Step 208: The server encapsulates the conversion association information into a dedicated service message corresponding to the target pushing account.

Step 210: The server pushes the dedicated service message to a social application client corresponding to the target pushing account.

Step 212: The social application client corresponding to the target pushing account reads the conversion association information included in the received dedicated service message.

Step 214: The social application client corresponding to the target pushing account generates a conversion prompt identifier corresponding to the conversion association information.

Step 216: The social application client corresponding to the target pushing account displays the conversion prompt identifier on an interface that is used for guiding a user of the social application client corresponding to the target pushing account to perform goods conversion.

Step 218: After a triggering signal acting on the conversion prompt identifier is received, the social application client corresponding to the target pushing account displays the conversion association information corresponding to the conversion prompt identifier.

In conclusion, in the information pushing method provided in this embodiment, after receiving at least one screening condition and to-be-pushed conversion association information that are sent by a social application client corresponding to an information providing account, a server obtains at least one target pushing account from candidate pushing accounts through screening according to the at least one screening condition, and after the conversion association information is encapsulated into a dedicated service message corresponding to the target pushing account, pushes the dedicated service message to a social application client corresponding to the target pushing account; therefore, on one hand, compared with that in the information releasing method involved in the background of the present disclosure, information is released for all Internet users, this embodiment of the present invention can effectively control the number and quality of the target pushing accounts by using a screening condition, so that the information is pushed in a targeted and intentional manner; on the other hand, compared with that in the information releasing method involved in the background of the present disclosure, an Internet user needs to open a webpage actively to view information, in this embodiment of the present invention, information is pushed to the target pushing account actively, thereby avoiding that some users really needing to receive the information miss the information; therefore, this embodiment of the present invention solves a problem that an effective acquisition rate of information is low in the information releasing method involved in the background of the present disclosure, and achieves an effect of greatly improving an effective acquisition rate of information by actively pushing conversion association information to some specific accounts.

Figure 3:
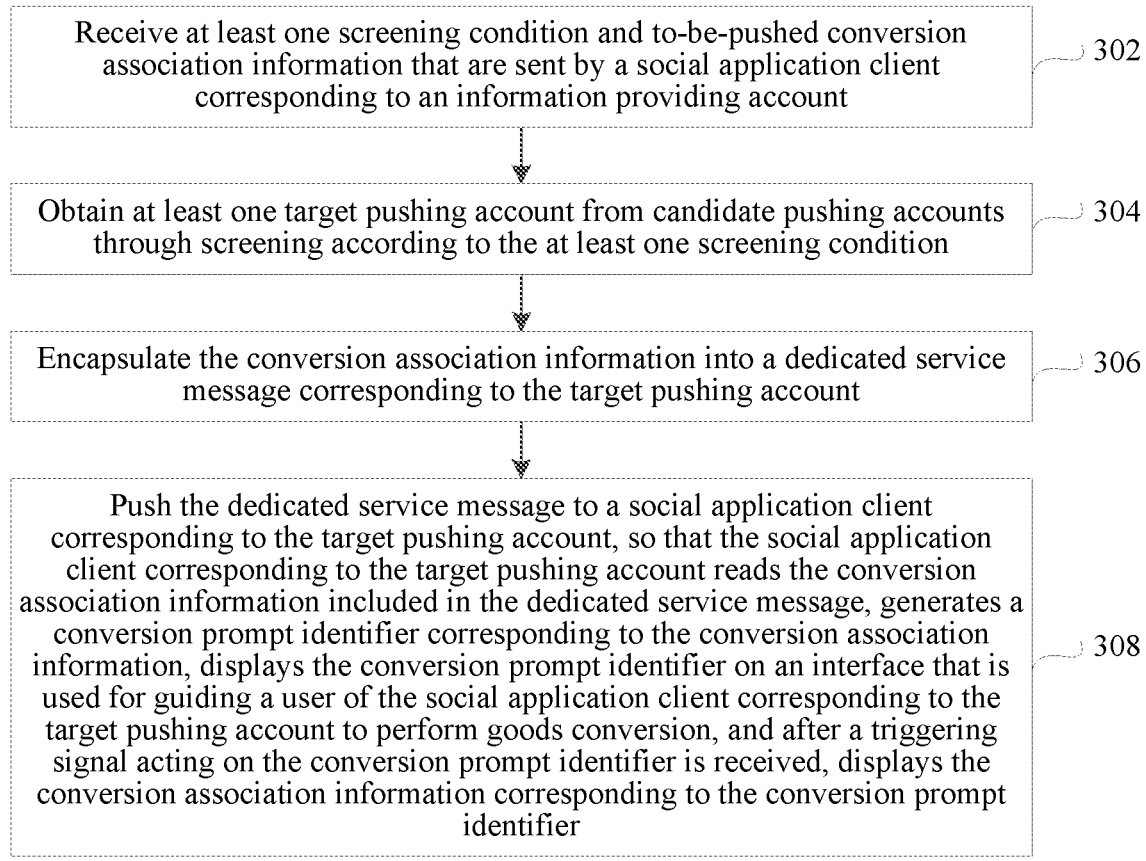
FIG. 3 is a flowchart of an information pushing method according to another embodiment of the present invention.

Refer to FIG. 3, which is a flowchart of an information pushing method according to another embodiment of the present invention. This embodiment makes description by using an example in which the information pushing method is used in a server in the implementation environment shown in FIG. 1. The information pushing method may include the following steps:

Step 302: Receive at least one screening condition and to-be-pushed conversion association information that are sent by a social application client corresponding to an information providing account.

Step 304: Obtain at least one target pushing account from candidate pushing accounts through screening according to the at least one screening condition.

Step 306: Encapsulate the conversion association information into a dedicated service message corresponding to the target pushing account.

Step 308: Push the dedicated service message to a social application client corresponding to the target pushing account, so that the social application client corresponding to the target pushing account reads the conversion association information included in the dedicated service message, generates a conversion prompt identifier corresponding to the conversion association information, displays the conversion prompt identifier on an interface that is used for guiding a user of the social application client corresponding to the target pushing account to perform goods conversion, and after a triggering signal acting on the conversion prompt identifier is received, displays the conversion association information corresponding to the conversion prompt identifier.

In conclusion, in the information pushing method provided in this embodiment, after receiving at least one screening condition and to-be-pushed conversion association information that are sent by a social application client corresponding to an information providing account, a server obtains at least one target pushing account from candidate pushing accounts through screening according to the at least one screening condition, and after the conversion association information is encapsulated into a dedicated service message corresponding to the target pushing account, pushes the dedicated service message to a social application client corresponding to the target pushing account; therefore, on one hand, compared with that in the information releasing method involved in the background of the present disclosure, information is released for all Internet users, this embodiment of the present invention can effectively control the number and quality of the target pushing accounts by using a screening condition, so that the information is pushed in a targeted and intentional manner; on the other hand, compared with that in the information releasing method involved in the background of the present disclosure, an Internet user needs to open a webpage actively to view information, in the embodiments of the present invention, information is pushed to the target pushing account actively, thereby avoiding that some users really needing to receive the information miss the information; therefore, this embodiment of the present invention solves a problem that an effective acquisition rate of information is low in the information releasing method involved in the background of the present disclosure, and achieves an effect of greatly improving an effective acquisition rate of information by actively pushing conversion association information to some specific accounts.

Figure 4:
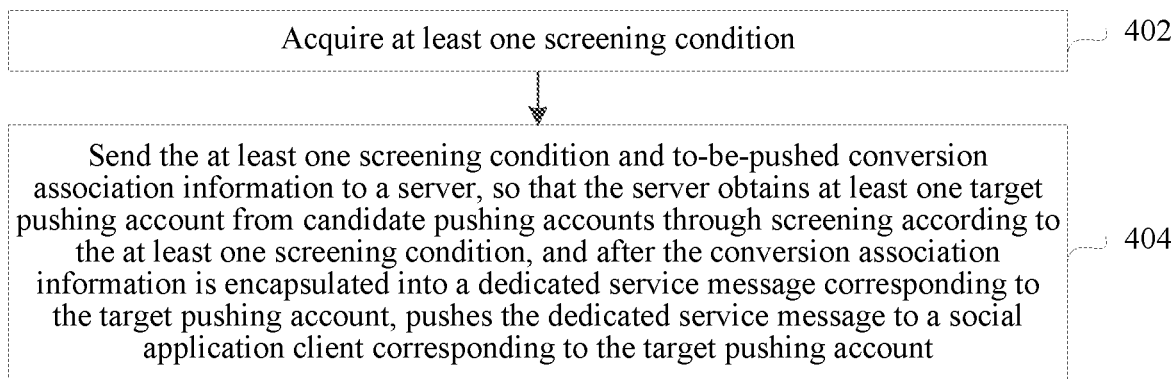
FIG. 4 is a flowchart of an information pushing method according to another embodiment of the present invention.

Refer to FIG. 4, which is a flowchart of an information pushing method according to another embodiment of the present invention. This embodiment makes description by using an example in which the information pushing method is used in a social application client, corresponding to an information providing account, running in the information providing terminal in the implementation environment shown in FIG. 1. The information pushing method may include the following steps:

Step 402: Acquire at least one screening condition.

Step 404: Send the at least one screening condition and to-be-pushed conversion association information to a server, so that the server obtains at least one target pushing account from candidate pushing accounts through screening according to the at least one screening condition, and after the conversion association information is encapsulated into a dedicated service message corresponding to the target pushing account, pushes the dedicated service message to a social application client corresponding to the target pushing account.

In conclusion, in the information pushing method provided in this embodiment, after acquiring at least one screening condition, a social application client corresponding to an information providing account sends the at least one screening condition and to-be-pushed conversion association information to a server, so that the server obtains at least one target pushing account from candidate pushing accounts through screening according to the at least one screening condition, and after the conversion association information is encapsulated into a dedicated service message corresponding to the target pushing account, pushes the dedicated service message to a social application client corresponding to the target pushing account; therefore, on one hand, compared with that in the information releasing method involved in the background of the present disclosure, information is released for all Internet users, this embodiment of the present invention can effectively control the number and quality of the target pushing accounts by using a screening condition, so that the information is pushed in a targeted and intentional manner; on the other hand, compared with that in the information releasing method involved in the background of the present disclosure, an Internet user needs to open a webpage actively to view information, in the embodiments of the present invention, information is pushed to the target pushing account actively, thereby avoiding that some users really needing to receive the information miss the information; therefore, this embodiment of the present invention solves a problem that an effective acquisition rate of information is low in the information releasing method involved in the background of the present disclosure, and achieves an effect of greatly improving an effective acquisition rate of information by actively pushing conversion association information to some specific accounts.

Figure 5:
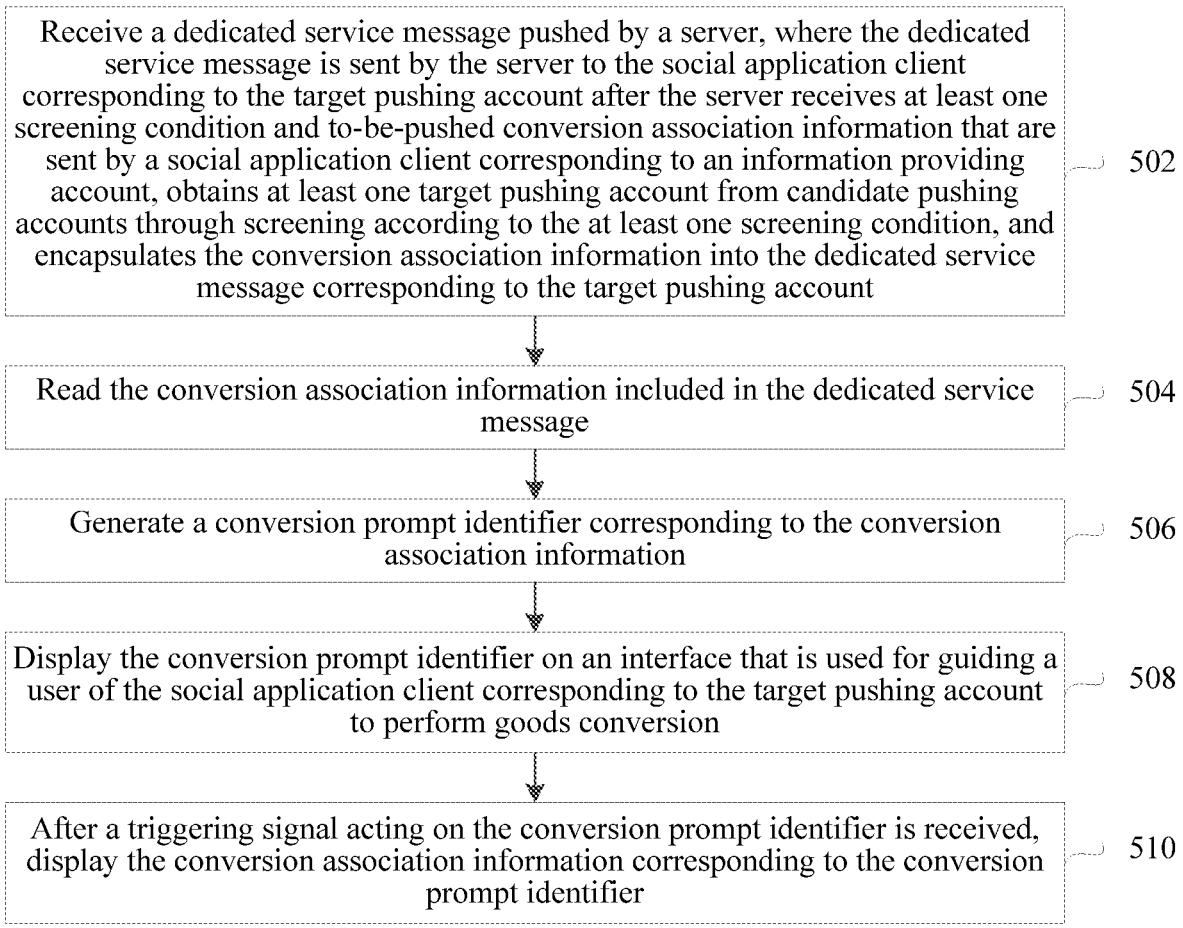
FIG. 5 is a flowchart of an information pushing method according to another embodiment of the present invention.

Refer to FIG. 5, which is a flowchart of an information pushing method according to another embodiment of the present invention. This embodiment makes description by using an example in which the information pushing method is used in a social application client, corresponding to a target pushing account, running in the target terminal in the implementation environment shown in FIG. 1. The information pushing method may include the following steps:

Step 502: Receive a dedicated service message pushed by a server, where the dedicated service message is sent by the server to the social application client corresponding to the target pushing account after the server receives at least one screening condition and to-be-pushed conversion association information that are sent by a social application client corresponding to an information providing account, obtains at least one target pushing account from candidate pushing accounts through screening according to the at least one screening condition, and encapsulates the conversion association information into the dedicated service message corresponding to the target pushing account.

Step 504: Read the conversion association information included in the dedicated service message.

Step 506: Generate a conversion prompt identifier corresponding to the conversion association information.

Step 508: Display the conversion prompt identifier on an interface that is used for guiding a user of the social application client corresponding to the target pushing account to perform goods conversion.

Step 510: After a triggering signal acting on the conversion prompt identifier is received, display the conversion association information corresponding to the conversion prompt identifier.

In conclusion, in the information pushing method provided in this embodiment, after receiving a dedicated service message pushed by a server, a social application client corresponding to a target pushing account reads conversion association information included in the dedicated service message, generates a conversion prompt identifier corresponding to the conversion association information, displays the conversion prompt identifier on an interface that is used for guiding a user of the social application client corresponding to the target pushing account to perform goods conversion, and after a triggering signal acting on the conversion prompt identifier is received, displays the conversion association information corresponding to the conversion prompt identifier, where the dedicated service message is sent by the server to the social application client corresponding to the target pushing account after the server receives at least one screening condition and to-be-pushed conversion association information that are sent by a social application client corresponding to an information providing account, obtains at least one target pushing account from candidate pushing accounts through screening according to the at least one screening condition, and encapsulates the conversion association information into the dedicated service message corresponding to the target pushing account; therefore, on one hand, compared with that in the information releasing method involved in the background of the present disclosure, information is released for all Internet users, this embodiment of the present invention can effectively control the number and quality of the target pushing accounts by using a screening condition, so that the information is pushed in a targeted and intentional manner; on the other hand, compared with that in the information releasing method involved in the background of the present disclosure, an Internet user needs to open a webpage actively to view information, in the embodiments of the present invention, information is pushed to the target pushing account actively, thereby avoiding that some users really needing to receive the information miss the information; therefore, this embodiment of the present invention solves a problem that an effective acquisition rate of information is low in the information releasing method involved in the background of the present disclosure, and achieves an effect of greatly improving an effective acquisition rate of information by actively pushing conversion association information to some specific accounts.

Figure 6A:
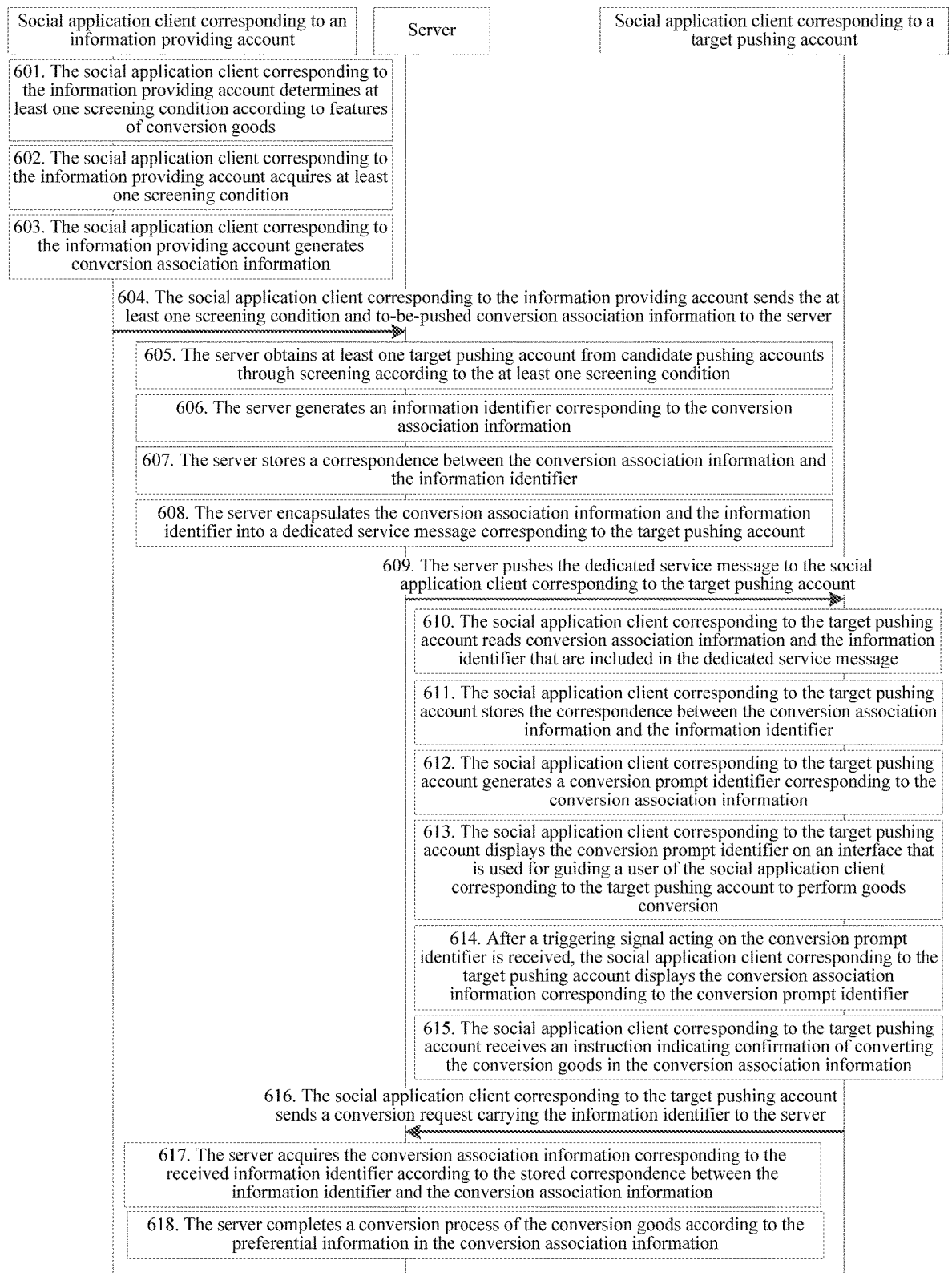
FIG. 6A is a flowchart of an information pushing method according to still another embodiment of the present invention.

Refer to FIG. 6A, which is a flowchart of an information pushing method according to another embodiment of the present invention. This embodiment makes description by using an example in which the information pushing method is used in the implementation environment shown in FIG. 1. The information pushing method may include the following steps:

Step 601: A social application client corresponding to an information providing account determines at least one screening condition according to features of conversion goods.

The conversion goods may be real goods such as food, clothing, or household appliances, or may be virtual goods such as virtual currency, game equipment, or membership paying annual fees. The at least one screening condition includes at least one of an account key word, gender, age, region, hobby, job, constellation, and network behavior records in the social application.

In this embodiment, description is made by using an example in which the information pushing method provided in this embodiment is used in an implementation scenario of online shopping. A seller launches some preferential and promotion activities, and needs to push preferential information to such consumers that the seller considers that the consumers have great purchase intentions and the seller can offer preference to the consumers. Therefore, the seller determines an appropriate screening condition with reference to actual estimation of the conversion goods on sale and according to factors such as an appropriate age, a suitable crowd, or a suitable region of the conversion goods, and obtains a batch of target pushing accounts through screening in a targeted manner.

Step 602: The social application client corresponding to the information providing account acquires at least one screening condition.

After determining the at least one screening condition according to the features of the conversion goods, the social application client corresponding to the information providing account acquires the at least one screening condition. For example, the following three screening conditions, namely, the gender being female, the age being 20 to 30, and the region being Guangzhou, are determined.

Step 603: The social application client corresponding to the information providing account generates conversion association information.

The conversion association information includes the conversion goods and preferential information of the conversion goods. The preferential information of the conversion goods may be information used for converting an original conversion value of the conversion goods into a conversion value after reduction and exemption, for example, reduction and exemption on the price of goods, discount of the price of goods, or reduction and exemption on postage, or the like. The preferential information of the conversion goods may be information used for providing bonus goods, for example, giving cash coupon upon shopping, or giving a gift upon shopping.

Figure 6B:
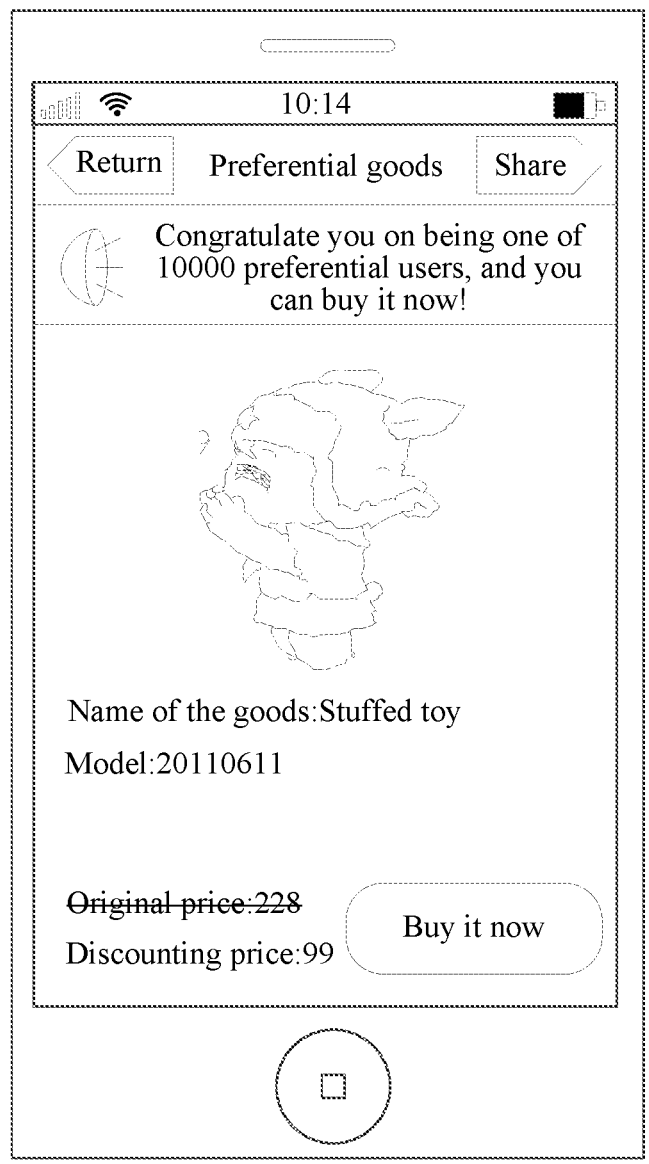
FIG. 6B is a schematic diagram of typical conversion association information involved in the present disclosure.

Refer to FIG. 6B, which is a schematic diagram of typical conversion association information. The typical conversion association information includes: the conversion goods being a picture and an introduction of a stuffed toy; and the preferential information of the conversion goods being an original price of 228/a discounting price of 99.

Step 604: The social application client corresponding to the information providing account sends the at least one screening condition and to-be-pushed conversion association information to a server.

The social application client corresponding to the information providing account sends the at least one screening condition and the to-be-pushed conversion association information to the server; the server obtains a batch of target pushing accounts through screening according to the at least one screening condition, and then sends the to-be-pushed conversion association information to the target pushing accounts obtained through screening.

Correspondingly, the server receives the at least one screening condition and the to-be-pushed conversion association information that are sent by the social application client corresponding to the information providing account.

Step 605: The server obtains at least one target pushing account from candidate pushing accounts through screening according to the at least one screening condition.

The server stores accounts of all social application clients, and the server obtains, from all candidate pushing accounts through screening, the at least one target pushing account satisfying the at least one screening condition. The at least one screening condition is sent to the server by the social application client corresponding to the information providing account, and includes at least one of an account key word, gender, age, region, hobby, job, constellation, and network behavior records in the social application.

In this embodiment, it is assumed that the screening condition received by the server includes the following three screening conditions, namely, the gender being female, the age being 20 to 30, and the region being Guangzhou. The server obtains, from all candidate pushing accounts through screening according to the three screening conditions, multiple target pushing accounts satisfying the condition, and the target pushing accounts obtained through screening are accounts used in the social application client by such consumers that the seller considers that the consumers have great purchase intentions and the seller can offer preference to the consumers.

Step 606: The server generates an information identifier corresponding to the conversion association information.

The information identifier accompanies with the conversion association information, and is used for identifying the conversion association information between the server and a social application client corresponding to the target pushing account, and is also used as a certificate provided to the buyer, that is, a user of the social application client corresponding to the target pushing account, to obtain the preference. The information identifier may be an identifier in a manner of figures, characters, or two-dimensional codes, or the like.

In a first possible implementation manner, the server generates one information identifier for the conversion association information.

One piece of conversion association information corresponds to one information identifier, for example, the information identifier is 911313.

In a second possible implementation manner, the server generates the information identifier, having the number being equal to the number of the target pushing accounts, for the conversion association information, where each information identifier corresponds to the conversion association information and each information identifier corresponds to one target pushing account.

One piece of conversion association information may correspond to multiple information identifiers, where the number of the multiple information identifiers is equal to the number of target pushing accounts. Assuming that the server obtains 10000 target pushing accounts through screening in step 605, the server generates 10000 information identifiers in this case, for example, 10000 consecutive information identifiers numbered from 80000001 to 80010000. Each information identifier corresponds to the conversion association information, and each information identifier corresponds to one target pushing account.

Step 607: The server stores a correspondence between the conversion association information and the information identifier.

Corresponding to the first possible implementation manner, the correspondence, stored in the server, between the conversion association information and the information identifier is that one piece of conversion association information corresponds to one information identifier.

Corresponding to the second possible implementation manner, the correspondence, stored in the server, between the conversion association information and the information identifier is that one piece of conversion association corresponds to multiple information identifiers.

Step 608: The server encapsulates the conversion association information and the information identifier into a dedicated service message corresponding to the target pushing account.

The dedicated service message is different from a chatting message forwarded between social application clients through the server in a normal case; the dedicated service message is a message that is similar to a system message, is dedicatedly used for indicating that the dedicated service message is used for goods conversion, and is encapsulated with the conversion association information and the information identifier.

Step 609: The server pushes the dedicated service message to the social application client corresponding to the target pushing account.

The server pushes, in a manner of information pushing, the dedicated service message to the at least one target pushing account obtained through screening, where the dedicated service message is encapsulated with the conversion association information and the information identifier corresponding to the conversion association information. In this way, it is implemented that the preferential information is exposed to consumers in a targeted and active manner, which can greatly improve a promotion effect.

Correspondingly, the social application client corresponding to the target pushing account receives the dedicated service message pushed by the server.

Step 610: The social application client corresponding to the target pushing account reads conversion association information and the information identifier that are included in the dedicated service message.

After receiving the dedicated service message pushed by the server, the social application client corresponding to the target pushing account reads the conversion association information and the information identifier from the dedicated service message.

Step 611: The social application client corresponding to the target pushing account stores the correspondence between the conversion association information and the information identifier.

After reading the conversion association information and the information identifier corresponding to the conversion association information, the social application client corresponding to the target pushing account stores the correspondence between the two. Because the conversion goods and the preferential information of the conversion goods are recorded in the conversion association information, the conversion association information is visible to the user of the social application client corresponding to the target pushing account, and the conversion association information needs to be exposed to the consumer, so as to attract the consumers to buy the goods.

In addition, the information identifier is invisible to the user of the social application client corresponding to the target pushing account. When buying related conversion goods subsequently, the social application client corresponding to the target pushing account does not need to automatically add the information identifier in a process of submitting an order or in a payment process, and the social application client corresponding to the target pushing account needs to automatically add the information identifier. For the user, this can avoid some unnecessary operations.

Step 612: The social application client corresponding to the target pushing account generates a conversion prompt identifier corresponding to the conversion association information.

Figure 6C:
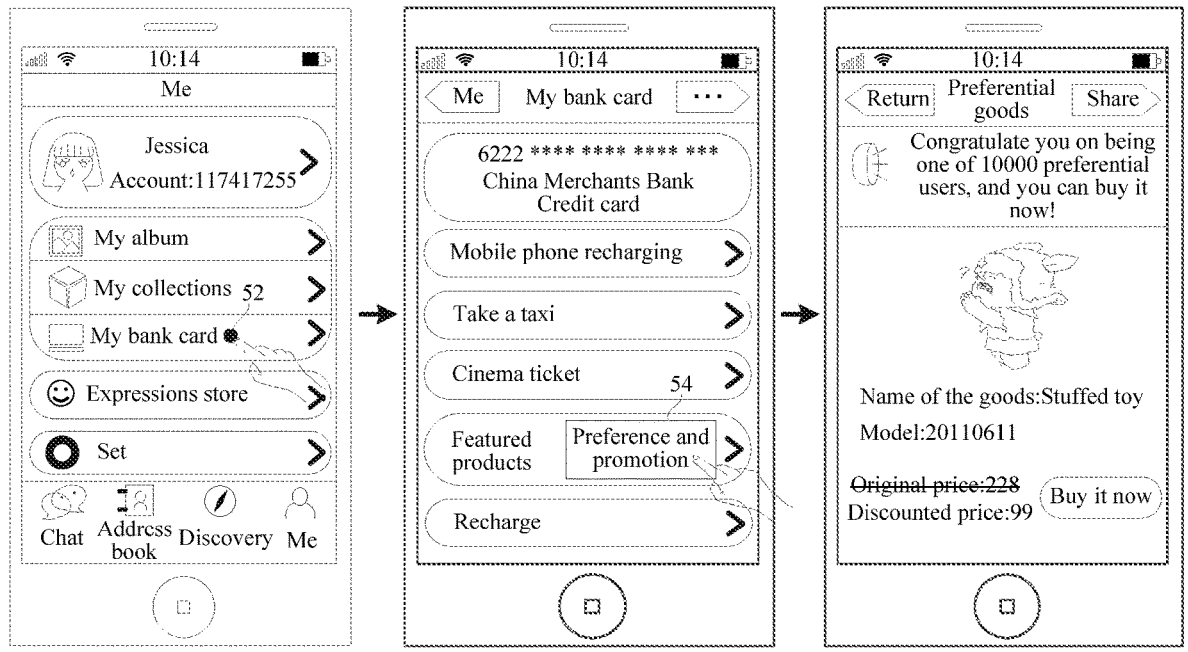
FIG. 6C is a schematic diagram of an interface used for guiding a user of a client to perform goods conversion involved in the present disclosure.

The conversion prompt identifier is used for guiding the user of the social application client corresponding to the target pushing account to read the conversion association information according to the conversion prompt identifier. For one piece of conversion association information, there may be one or more corresponding conversion prompt identifiers. Refer to FIG. 6C, for the conversion association information involved in this embodiment, the social application client corresponding to the target pushing account generates two conversion prompt identifiers, namely, one dot"." 62 shown in the left of FIG. 6C and text "preference and promotion" 64 shown in the middle of FIG. 6C.

Step 613: The social application client corresponding to the target pushing account displays the conversion prompt identifier on an interface that is used for guiding the user of the social application client corresponding to the target pushing account to perform goods conversion.

After opening the social application client, the user may view the conversion prompt identifier on a related interface, and further view the conversion association information according to the conversion prompt identifier. Refer to FIG. 6C, the user may view the dot"." 62 in the column "my bank card" on the interface shown in the left of FIG. 6C, clicks and enters the interface of "my bank card" according to the conversion prompt identifier, and view the text "preference and promotion" 64 on the interface of "my bank card", and further clicks and enters the interface of the conversion association information according to the conversion prompt identifier.

Certainly, the conversion prompt identifier and the interface that is used for guiding the user of the social application client corresponding to the target pushing account may also have other manners, and this embodiment makes description only by using an example of a representation form shown in FIG. 6C, which is not specifically limited.

Step 614: After a triggering signal acting on the conversion prompt identifier is received, the social application client corresponding to the target pushing account displays the conversion association information corresponding to the conversion prompt identifier.

After displaying the conversion association information, the social application client corresponding to the target pushing account exposes the conversion association information to the user of the social application client, and shows the conversion goods and the preferential information of the conversion goods to the user.

Step 601 to step 614 implement pushing and exposing the conversion association information to some specific target pushing accounts actively. The following further describes how to obtain, after the user of the social application client corresponding to the target pushing account views the conversion association information and when buying the related conversion goods or after buying the related conversion goods, the preference provided by the seller.

Step 615: The social application client corresponding to the target pushing account receives an instruction indicating confirmation of converting the conversion goods in the conversion association information.

After viewing the conversion goods and the preferential information in the conversion association information, if the user of the social application client corresponding to the target pushing account needs to buy the conversion goods, the user may click a button of submitting the order or confirming the purchase to complete purchase. When clicking the button of submitting the order or confirming the purchase, the instruction indicating confirmation of converting the conversion goods in the conversion association information is generated.

Step 616: The social application client corresponding to the target pushing account sends a conversion request carrying the information identifier to the server.

In step 606, it is introduced that the information identifier is used for providing a certificate to the buyer, that is, the user of the social application client corresponding to the target pushing account, in the goods conversion process to obtain the preference. Although the information identifier is invisible to the user of the social application client corresponding to the target pushing account, when the user confirms to buy the conversion goods in the conversion association information according to the received conversion association information, the social application client corresponding to the target pushing account submits the information identifier and the conversion request of the order or payment to the server, so that the server completes the corresponding preference according to the information identifier.

Correspondingly, the server receives the conversion request carrying the information identifier and sent by the social application client corresponding to the target pushing account.

Step 617: The server acquires the conversion association information corresponding to the received information identifier according to the stored correspondence between the information identifier and the conversion association information.

In step 607, the server has stored the correspondence between the conversion association information and the information identifier, and in this case, when receiving the information identifier sent by the social application client corresponding to the target pushing account, the server finds the conversion association information corresponding to the received information identifier from the stored correspondence. The conversion association information includes the conversion goods and the preferential information of the conversion goods.

Certainly, before this step, the server may also verify whether the received information identifier is valid, for example, verify whether the information identifier exceeds the period of validity or whether the information identifier is correct.

Step 618: The server completes the conversion process of the conversion goods according to the preferential information in the conversion association information.

After finding the conversion association information corresponding to the received information identifier from the stored correspondence, the server completes the conversion process of the conversion goods according to the preferential information in the conversion association information. Specifically, this step includes the following two possible implementation manners:

In a first possible implementation manner, when the preferential information of the conversion goods is information used for converting an original conversion value of the conversion goods into a conversion value after reduction and exemption, this step includes the following several sub-steps:

First, convert the original conversion value of the conversion goods into the conversion value after reduction and exemption according to the preferential information.

When the preferential information is information used for converting the original conversion value of the conversion goods into the conversion value after reduction and exemption, the preferential information has the following possible implementation manners: the preferential information includes the original conversion value and the conversion value after reduction and exemption of the conversion goods (as shown in FIG. 6B); or, the preferential information includes the original conversion value and the value after reduction and exemption of the conversion goods; or, the preferential information includes the original conversion value and a discounting value of the conversion goods, or the like.

The server converts the original conversion value of the conversion goods into the conversion value after reduction and exemption according to the preferential information, that is, obtains the conversion value of the conversion goods after the preference. The conversion value after reduction and exemption obtained according to the preferential information included in the conversion association information shown in FIG. 6B is 99.

Second, subtract the conversion value after reduction and exemption from a first value corresponding to the target pushing account.

The server subtracts the conversion value after reduction and exemption from the first value corresponding to the target pushing account. The first value corresponding to the target pushing account may be an online payment account, or an electronic bank account of the user of the social application client corresponding to the target pushing account. When the user buys related conversion goods, the user needs to subtract the conversion value after reduction and exemption from the first value of the online payment account or the electronic bank account of the user. For example, an original balance of the electronic bank account of the user is 100, and the balance of the electronic bank account after the conversion value 99 after reduction and exemption is subtracted is 1.

Third, add the conversion value after reduction and exemption to a second value corresponding to the information providing account.

The server adds the conversion value after reduction and exemption to the second value corresponding to the information providing account. The user of the social application client corresponding to the information providing account is the seller, that is, the person selling the conversion goods. The server needs to add the conversion value after reduction and exemption to the second value of the online payment account or the electronic bank account of the seller. For example, an original balance of the electronic bank account of the seller is 1000, and a balance of the electronic bank account after the conversion value 99 after reduction and exemption is added is 1099.

In the first possible implementation manner, the preferential manner is subtraction from the original conversion value of the conversion goods. In the following second possible implementation manner, the preferential manner is providing some bonus goods for the seller, however, no subtraction is performed on the original conversion value of the conversion goods.

In the second possible implementation manner, when the preferential information of the conversion goods is information used for providing bonus goods, this step includes the following multiple sub-steps:

First, subtract the original conversion value of the conversion goods from the first value corresponding to the target pushing account;

When the preferential information is information used for providing the bonus goods, the bonus goods may be any real goods or virtual goods, where the common bonus goods includes an electronic conversion coupon, a small gift, or an electronic voucher, or the like.

In this preferential manner, no subtraction is performed on the original conversion value of the conversion goods. Therefore, the server subtracts the original conversion value of the conversion goods from the first value corresponding to the target pushing account.

Second, add the original conversion value to the second value corresponding to the information providing account.

Correspondingly, the server adds the original conversion value to the second value corresponding to the information providing account.

Third: The social application client corresponding to the information providing account sends a response indicating that the conversion succeeds.

After completing the subtraction and adding of the conversion value, the server sends the response indicating that the conversion succeeds to the social application client corresponding to the information providing account, where the response indicating that the conversion succeeds is used for prompting the information providing account to providing the bonus goods to the target pushing account, so as to notify the seller to realize the corresponding preferential activities.

It should be noted that, in an actual application, any preferential manner involved in the foregoing two possible implementation manners may be selected, or a preferential manner in combination with the preferential manner involved in the foregoing two possible implementation manners may also be used, which is not specifically limited.

In conclusion, in the information pushing method provided in this embodiment, after receiving at least one screening condition and to-be-pushed conversion association information that are provided by a social application client corresponding to an information providing account, a server obtains at least one target pushing account from candidate pushing accounts through screening according to the at least one screening condition, and after the conversion association information is encapsulated into a dedicated service message corresponding to the target pushing account, pushes the dedicated service message to a social application client corresponding to the target pushing account; therefore, on one hand, compared with that in the information releasing method involved in the background of the present disclosure, information is released for all Internet users, this embodiment of the present invention can effectively control the number and quality of the target pushing accounts by using a screening condition, so that the information is pushed in a targeted and intentional manner; on the other hand, compared with that in the information releasing method involved in the background of the present disclosure, an Internet user needs to open a webpage actively to view information, in the embodiments of the present invention, information is pushed to the target pushing account actively, thereby avoiding that some users really needing to receive the information miss the information; therefore, this embodiment of the present invention solves a problem that an effective acquisition rate of information is low in the information releasing method involved in the background of the present disclosure, and achieves an effect of greatly improving an effective acquisition rate of information by actively pushing conversion association information to some specific accounts.

In addition, compared with an existing manner in which the reduction and exemption is performed through the conversion code or the conversion voucher, where the manner requires that the user manually inputs the conversion code or selects the conversion voucher in the conversion or payment process, in this embodiment of the present invention, the information identifier corresponding to the conversion association information is generated, where the conversion identifier is used for identifying the conversion association information between the server and the social application client corresponding to the target pushing account, and the information identifier is invisible to the user of the social application client corresponding to the target pushing account, so that the user corresponding to the target pushing account does not need to add or input the information identifier in the conversion or payment process, thereby reducing unnecessary steps in the conversion or payment process, and improving conversion or payment efficiency. Further, when the number of the information identifiers is equal to the number of the target pushing accounts, and each information identifier corresponds to the conversion association information and each information identifier corresponds to one target pushing account, the server can acquires, according to the information identifier, the target pushing account finally buying the related conversion goods, thereby performing related data statistics, where the data statistics is used for providing a reference when screening is performed on the target pushing account next.

The following is apparatus embodiments of the present invention, which can be configured to execute the method embodiments of the present invention. For details not disclosed in the embodiments of the present invention, please refer to the method embodiments of the present invention.

Figure 7:
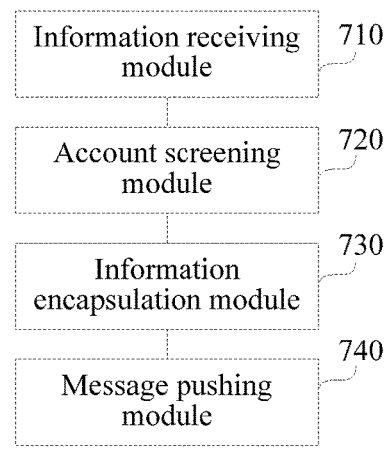
FIG. 7 is a structural block diagram of an information pushing apparatus according to an embodiment of the present invention.

Refer to FIG. 7, which is a schematic block diagram of an information pushing apparatus according to an embodiment of the present invention. The information pushing apparatus is used in a server. The information pushing apparatus may be implemented as a part or all of the server through software, hardware, or a combination of the two. The information pushing apparatus includes: an information receiving module 710, an account screening module 720, an information encapsulation module 730, and a message pushing module 740, where the information receiving module 710 is configured to receive at least one screening condition and to-be-pushed conversion association information that are sent by a social application client corresponding to an information providing account;

the account screening module 720 is configured to obtain at least one target pushing account from candidate pushing accounts through screening according to the at least one screening condition;

the information encapsulation module 730 is configured to encapsulate the conversion association information into a dedicated service message corresponding to the target pushing account; and the message pushing module 740 is configured to push the dedicated service message to a social application client corresponding to the target pushing account, so that the social application client corresponding to the target pushing account reads the conversion association information included in the dedicated service message, generates a conversion prompt identifier corresponding to the conversion association information, displays the conversion prompt identifier on an interface that is used for guiding a user of the social application client corresponding to the target pushing account to perform goods conversion, and after a triggering signal acting on the conversion prompt identifier is received, displays the conversion association information corresponding to the conversion prompt identifier.

In conclusion, in the information pushing apparatus provided in this embodiment, after receiving at least one screening condition and to-be-pushed conversion association information that are sent by a social application client corresponding to an information providing account, a server obtains at least one target pushing account from candidate pushing accounts through screening according to the at least one screening condition, and after the conversion association information is encapsulated into a dedicated service message corresponding to the target pushing account, pushes the dedicated service message to a social application client corresponding to the target pushing account; therefore, on one hand, compared with that in the information releasing method involved in the background of the present disclosure, information is released for all Internet users, this embodiment of the present invention can effectively control the number and quality of the target pushing accounts by using a screening condition, so that the information is pushed in a targeted and intentional manner; on the other hand, compared with that in the information releasing method involved in the background of the present disclosure, an Internet user needs to open a webpage actively to view information, in the embodiments of the present invention, information is pushed to the target pushing account actively, thereby avoiding that some users really needing to receive the information miss the information; therefore, this embodiment of the present invention solves a problem that an effective acquisition rate of information is low in the information releasing method involved in the background of the present disclosure, and achieves an effect of greatly improving an effective acquisition rate of information by actively pushing conversion association information to some specific accounts.

Figure 8:
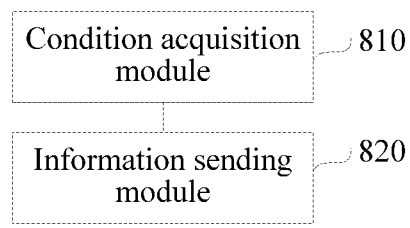
FIG. 8 is a structural block diagram of an information pushing apparatus according to another embodiment of the present invention.

Refer to FIG. 8, which is a schematic block diagram of an information pushing apparatus according to another embodiment of the present invention. The information pushing apparatus is used in a social application client corresponding to an information providing account. The information pushing apparatus may be implemented as a part or all of the social application client corresponding to the information providing account through software, hardware, or a combination of the two. The information pushing apparatus includes: a condition acquisition module 810 and an information sending module 820, where the condition acquisition module 810 is configured to acquire at least one screening condition; and the information sending module 820 is configured to send the at least one screening condition and to-be-pushed conversion association information to a server, so that the server obtains at least one target pushing account from candidate pushing accounts through screening according to the at least one screening condition, and after the conversion association information is encapsulated into a dedicated service message corresponding to the target pushing account, pushes the dedicated service message to a social application client corresponding to the target pushing account.

In conclusion, in the information pushing apparatus provided in this embodiment, after acquiring at least one screening condition, a social application client corresponding to an information providing account sends the at least one screening condition and to-be-pushed conversion association information to a server, so that the server obtains at least one target pushing account from candidate pushing accounts through screening according to the at least one screening condition, and after the conversion association information is encapsulated into a dedicated service message corresponding to the target pushing account, pushes the dedicated service message to a social application client corresponding to the target pushing account; therefore, on one hand, compared with that in the information releasing method involved in the background of the present disclosure, information is released for all Internet users, this embodiment of the present invention can effectively control the number and quality of the target pushing accounts by using a screening condition, so that the information is pushed in a targeted and intentional manner; on the other hand, compared with that in the information releasing method involved in the background of the present disclosure, an Internet user needs to open a webpage actively to view information, in the embodiments of the present invention, information is pushed to the target pushing account actively, thereby avoiding that some users really needing to receive the information miss the information; therefore, this embodiment of the present invention solves a problem that an effective acquisition rate of information is low in the information releasing method involved in the background of the present disclosure, and achieves an effect of greatly improving an effective acquisition rate of information by actively pushing conversion association information to some specific accounts.

Figure 9:
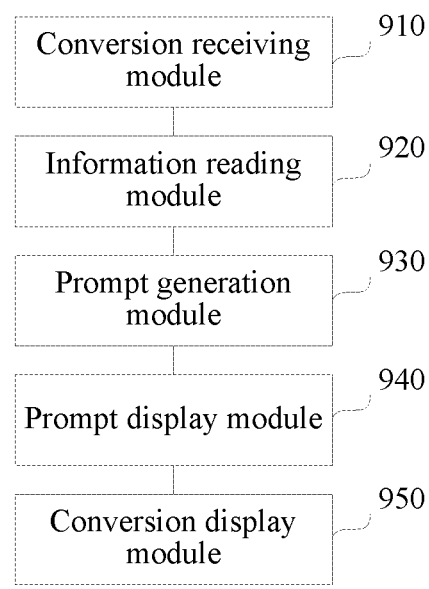
FIG. 9 is a structural block diagram of an information pushing apparatus according to still another embodiment of the present invention.

Refer to FIG. 9, which is a schematic block diagram of an information pushing apparatus according to another embodiment of the present invention. The information pushing apparatus is used in a social application client corresponding to a target pushing account. The information pushing apparatus may be implemented as a part or all of the social application client corresponding to the target pushing account through software, hardware, or a combination of the two. The information pushing apparatus includes a conversion receiving module 910, an information reading module 920, a prompt generation module 930, a prompt display module 940, and a conversion display module 950, where the conversion receiving module 910 is configured to receive a dedicated service message pushed by a server, where the dedicated service message is sent by the server to the social application client corresponding to the target pushing account after the server receives at least one screening condition and to-be-pushed conversion association information that are sent by a social application client corresponding to an information providing account, obtains at least one target pushing account from candidate pushing accounts through screening according to the at least one screening condition, and encapsulates the conversion association information into the dedicated service message corresponding to the target pushing account;

the information reading module 920 is configured to read the conversion association information included in the dedicated service message;

the prompt generation module 930 is configured to generate a conversion prompt identifier corresponding to the conversion association information;

the prompt display module 940 is configured to display the conversion prompt identifier on an interface that is used for guiding a user of the social application client corresponding to the target pushing account to perform goods conversion; and the conversion display module 950 is configured to: after a triggering signal acting on the conversion prompt identifier is received, display the conversion association information corresponding to the conversion prompt identifier.

In conclusion, in the information pushing apparatus provided in this embodiment, after receiving a dedicated service message pushed by a server, a social application client corresponding to a target pushing account reads conversion association information included in the dedicated service message, generates a conversion prompt identifier corresponding to the conversion association information, displays the conversion prompt identifier on an interface that is used for guiding a user of the social application client corresponding to the target pushing account to perform goods conversion, and after a triggering signal acting on the conversion prompt identifier is received, displays the conversion association information corresponding to the conversion prompt identifier, where the dedicated service message is sent by the server to the social application client corresponding to the target pushing account after the server receives at least one screening condition and to-be-pushed conversion association information that are sent by a social application client corresponding to an information providing account, obtains at least one target pushing account from candidate pushing accounts through screening according to the at least one screening condition, and encapsulates the conversion association information into the dedicated service message corresponding to the target pushing account; therefore, on one hand, compared with that in the information releasing method involved in the background of the present disclosure, information is released for all Internet users, this embodiment of the present invention can effectively control the number and quality of the target pushing accounts by using a screening condition, so that the information is pushed in a targeted and intentional manner; on the other hand, compared with that in the information releasing method involved in the background of the present disclosure, an Internet user needs to open a webpage actively to view information, in the embodiments of the present invention, information is pushed to the target pushing account actively, thereby avoiding that some users really needing to receive the information miss the information; therefore, this embodiment of the present invention solves a problem that an effective acquisition rate of information is low in the information releasing method involved in the background of the present disclosure, and achieves an effect of greatly improving an effective acquisition rate of information by actively pushing conversion association information to some specific accounts.

Figure 10:
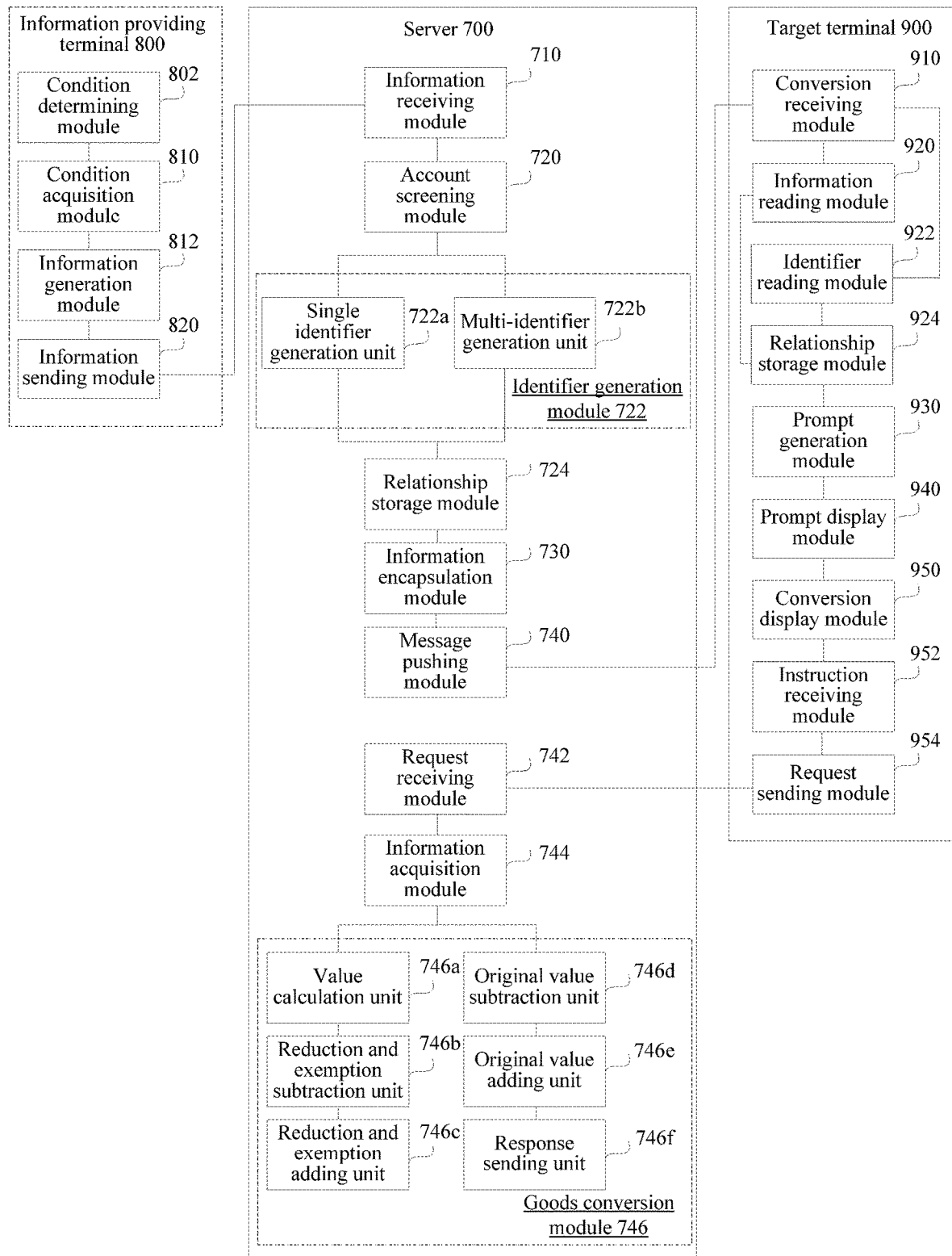
FIG. 10 is a structural block diagram of an information pushing system according to an embodiment of the present invention.

Refer to FIG. 10, which is a schematic block diagram of an information pushing system according to an embodiment of the present invention. The information pushing system includes a server 700, an information providing terminal 800 connected to the server 700 through a wired network or a wireless network, and a target terminal 900 connected to the server 700 through a wired network or a wireless network.

The server 700 includes an information pushing apparatus, and the information pushing apparatus may be implemented as a part or all of a server through software, hardware, or a combination of the two. The information pushing apparatus includes an information receiving module 710, an account screening module 720, an identifier generation module 722, a relationship storage module 724, an information encapsulation module 730, a message pushing module 740, a request receiving module 742, an information acquisition module 744, and a goods conversion module 746.

The information receiving module 710 is configured to receive at least one screening condition and to-be-pushed conversion association information that are sent by a social application client corresponding to an information providing account.

The account screening module 720 is configured to obtain at least one target pushing account from candidate pushing accounts through screening according to the at least one screening condition.

Specifically, the account screening module 720 is configured to obtain, from all candidate pushing accounts through screening, at least one target pushing account satisfying the at least one screening condition, where the at least one screening condition includes at least one of an account key word, gender, age, region, hobby, job, constellation, and network behavior records in the social application.

The identifier generation module 722 is configured to generate an information identifier corresponding to the conversion association information.

Specifically, the identifier generation module 722 includes a single identifier generation unit 722a, or a multi-identifier generation unit 722b, where the single identifier generation unit 722a is configured to generate one information identifier for the conversion association information; and the multi-identifier generation unit 722b is configured to generate the information identifier, having the number being equal to the number of the target pushing accounts, for the conversion association information, where each information identifier corresponds to the conversion association information and each information identifier corresponds to one target pushing account.

The relationship storage module 724 is configured to store a correspondence between the conversion association information and the information identifier.

The information encapsulation module 730 is configured to encapsulate the conversion association information and the information identifier into a dedicated service message corresponding to the target pushing account.

The message pushing module 740 is configured to push the conversion association information to a social application client corresponding to the at least one target pushing account.

The information identifier is used for identifying the conversion association information, and after the information identifier is pushed to the social application client corresponding to the target pushing account, the information identifier is invisible to a user of the social application client corresponding to the target pushing account.

Further, when the conversion association information includes conversion goods and preferential information of the conversion goods, the apparatus further includes: a request receiving module 742, an information acquisition module 744, and a goods conversion module 746, where the request receiving module 742 is configured to receive a conversion request carrying the information identifier and sent by the social application client corresponding to the target pushing account, where the conversion request is sent by the social application client corresponding to the target pushing account after receiving an instruction indicating confirmation of converting the conversion goods in the conversion association information;

the information acquisition module 744 is configured to acquire the conversion association information corresponding to the received information identifier according to the correspondence between the information identifier and the conversion association information; and the goods conversion module 746 is configured to complete a conversion process of converting the conversion goods according to the preferential information in the conversion association information.

Further, when the preferential information of the conversion goods is information used for converting an original conversion value of the conversion goods into a conversion value after reduction and exemption, the goods conversion module 746 includes a value calculation unit 746a, a reduction and exemption subtraction unit 746b, and a reduction and exemption adding unit 746c, where the value calculation unit 746a is configured to convert the original conversion value of the conversion goods into the conversion value after reduction and exemption according to the preferential information;

the reduction and exemption subtraction unit 746b is configured to subtract the conversion value after reduction and exemption from a first value corresponding to the target pushing account; and the reduction and exemption adding unit 746c is configured to add the conversion value after reduction and exemption to a second value corresponding to the information providing account.

Further, when the preferential information of the conversion goods is information used for providing bonus goods, the goods conversion module 746 includes an original conversion value subtraction unit 746d, an original conversion value adding unit 746e, and a response sending unit 746f, where the original conversion value subtraction unit 746d is configured to subtract the original conversion value of the conversion goods from the first value corresponding to the target pushing account;

the original conversion value adding unit 746e is configured to add the original conversion value to the second value corresponding to the information providing account; and the response sending unit 746f is configured to send a response indicating that the conversion succeeds, where the response indicating that the conversion succeeds is used for prompting the information providing account to provide the bonus goods to the target pushing account.

The information providing terminal 800 includes an information providing apparatus. The information pushing apparatus may be implemented as a part or all of the social application client corresponding to the information providing account through software, hardware, or a combination of the two. The information pushing apparatus includes a condition determining module 802, a condition acquisition module 810, an information generation module 812, and an information sending module 820, where the condition determining module 802 is configured to determine the at least one screening condition according to features of conversion goods, where the at least one screening condition includes at least one of an account key word, gender, age, region, hobby, job, constellation, and network behavior records in the social application;

the condition acquisition module 810 is configured to acquire the at least one screening condition;

the information generation module 812 is configured to generate the conversion association information, where the conversion association information includes the conversion goods and preferential information of the conversion goods, the preferential information of the conversion goods is information used for converting the original conversion value of the conversion goods into a conversion value after reduction and exemption, or the preferential information of the conversion goods is information used for providing the bonus goods; and the information sending module 820 is configured to send the at least one screening condition and to-be-pushed conversion association information to the server, so that the server obtains at least one target pushing account from candidate pushing accounts through screening according to the at least one screening condition, and after the conversion association information is encapsulated into a dedicated service message corresponding to the target pushing account, pushes the dedicated service message to a social application client corresponding to the target pushing account.

The target terminal 900 includes an information pushing apparatus. The information pushing apparatus may be implemented as a part or all of the social application client corresponding to the target pushing account through software, hardware, or a combination of the two. The information pushing apparatus includes a conversion receiving module 910, an information reading module 920, an identifier reading module 922, a relationship storage module 924, a prompt generation module 930, a prompt display module 940, a conversion display module 950, an instruction receiving module 952, and a request sending module 954, where the conversion receiving module 910 is configured to receive a dedicated service message pushed by a server, where the dedicated service message is sent by the server to the social application client corresponding to the target pushing account after the server receives at least one screening condition and to-be-pushed conversion association information that are sent by a social application client corresponding to an information providing account, obtains at least one target pushing account from candidate pushing accounts through screening according to the at least one screening condition, and encapsulates the conversion association information into the dedicated service message corresponding to the target pushing account;

the information reading module 920 is configured to read the conversion association information included in the dedicated service message;

the identifier reading module 922 is configured to read the information identifier included in the dedicated service message;

the relationship storage module 924 is configured to store a correspondence between the conversion association information and the information identifier, where the information identifier is invisible to a user of the social application client corresponding to the target pushing account;

the prompt generation module 930 is configured to generate a conversion prompt identifier corresponding to the conversion association information;

the prompt display module 940 is configured to display the conversion prompt identifier on an interface that is used for guiding a user of the social application client corresponding to the target pushing account to perform goods conversion;

the conversion display module 950 is configured to: after a triggering signal acting on the conversion prompt identifier is received, display the conversion association information corresponding to the conversion prompt identifier;

the instruction receiving module 952 is configured to receive an instruction indicating confirmation of converting the conversion goods in the conversion association information; and the request sending module 954 is configured to send the conversion request carrying the information identifier to the server, so that the server acquires the conversion association information corresponding to the received information identifier according to the stored correspondence between the information identifier and the conversion association information, and completes the conversion process of the conversion goods according to the preferential information in the conversion association information.

In conclusion, in the information pushing system provided in this embodiment, after receiving at least one screening condition and to-be-pushed conversion association information that are sent by a social application client corresponding to an information providing account, a server obtains at least one target pushing account from candidate pushing accounts through screening according to the at least one screening condition, and after the conversion association information is encapsulated into a dedicated service message corresponding to the target pushing account, pushes the dedicated service message to a social application client corresponding to the target pushing account; therefore, on one hand, compared with that in the information releasing method involved in the background of the present disclosure, information is released for all Internet users, this embodiment of the present invention can effectively control the number and quality of the target pushing accounts by using a screening condition, so that the information is pushed in a targeted and intentional manner; on the other hand, compared with that in the information releasing method involved in the background of the present disclosure, an Internet user needs to open a webpage actively to view information, in the embodiments of the present invention, information is pushed to the target pushing account actively, thereby avoiding that some users really needing to receive the information miss the information; therefore, this embodiment of the present invention solves a problem that an effective acquisition rate of information is low in the information releasing method involved in the background of the present disclosure, and achieves an effect of greatly improving an effective acquisition rate of information by actively pushing conversion association information to some specific accounts.

In addition, compared with an existing manner in which the reduction and exemption is performed through the conversion code or the conversion voucher, where the manner requires that the user manually inputs the conversion code or selects the conversion voucher in the conversion or payment process, in this embodiment of the present invention, the information identifier corresponding to the conversion association information is generated, where the conversion identifier is used for identifying the conversion association information between the server and the social application client corresponding to the target pushing account, and the information identifier is invisible to the user of the social application client corresponding to the target pushing account, so that the user corresponding to the target pushing account does not need to add or input the information identifier in the conversion or payment process, thereby reducing unnecessary steps in the conversion or payment process, and improving conversion or payment efficiency. Further, when the number of the information identifiers is equal to the number of the target pushing accounts, and each information identifier corresponds to the conversion association information and each information identifier corresponds to one target pushing account, the server can acquires, according to the information identifier, the target pushing account finally buying the related conversion goods, thereby performing related data statistics, where the data statistics is used for providing a reference when screening is performed on the target pushing account next.

Figure 11:
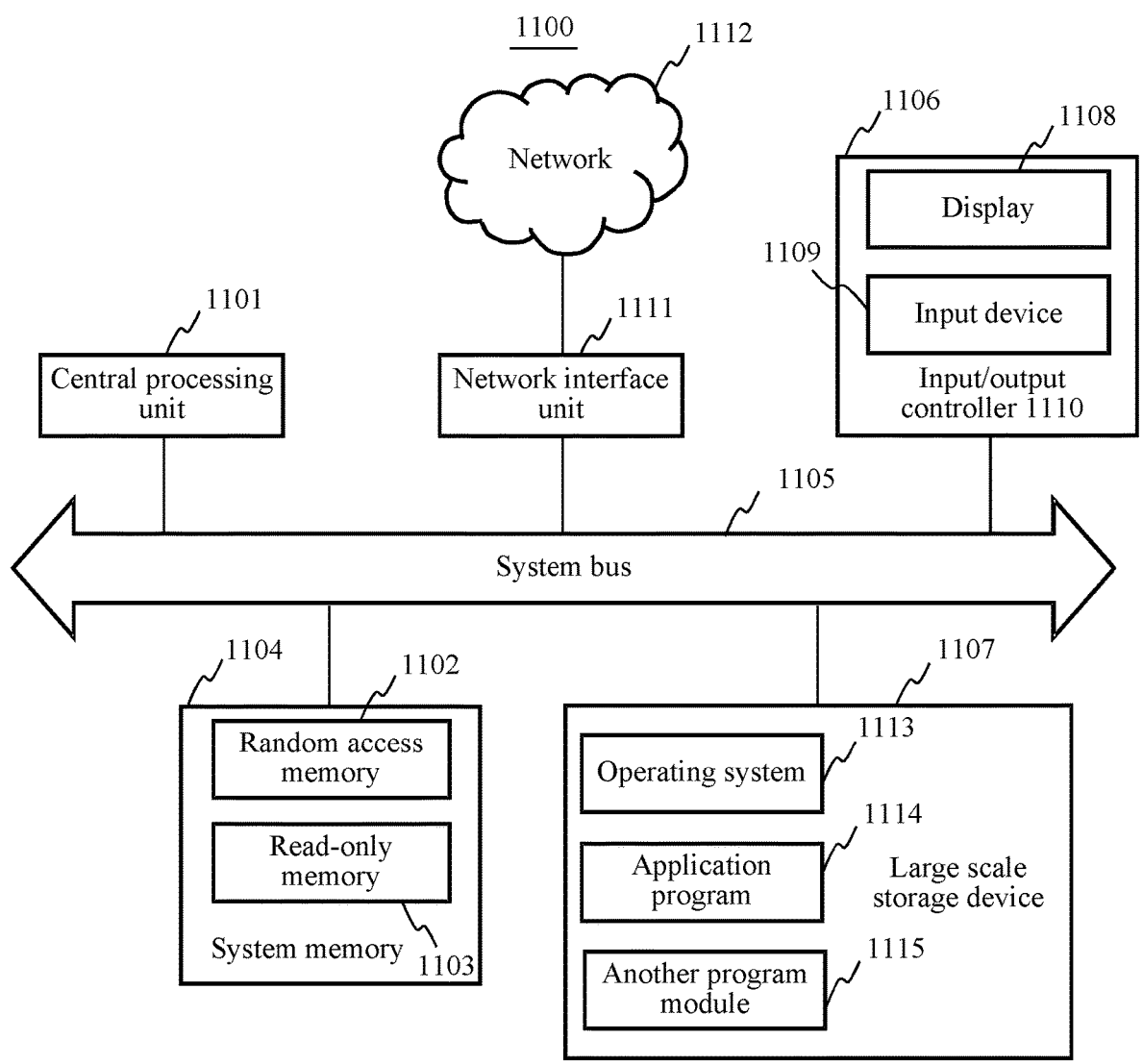
FIG. 11 is a schematic structural diagram of a server according to an embodiment of the present invention.

It should be noted that: when the information pushing apparatus and system provided in the foregoing embodiments push information, only division of each functional module is used as an example for description. In a practical application, the foregoing functions may be allocated to and implemented by different functional modules according to demands, that is, an internal structure of the device is divided into different function modules, so as to implement all or part of the functions described above. In addition, the information pushing apparatus provided in the foregoing embodiments and the information pushing method embodiment belong to one concept. For a specific implementation process, refer to the method embodiment, which is not further described herein Refer to FIG. 11, which is a schematic structural diagram of a server according to an embodiment of the present invention. The server may be configured to implement the information pushing method in the server provided in the foregoing embodiment. The server 1100 includes a central processing unit (CPU) 1101, a system memory 1104 including a random access memory (RAM) 1102 and a read-only memory (ROM) 1103, and a system bus 1105 connecting the system memory 1104 and the CPU 1101. The server 1100 further includes a basic input/output system (I/O system) 1106 helping information transmission between components in a computer, and a large scale storage device 1107 configured to store an operating system 1113, an application program 1114, and another program module 1115.

The basic I/O system 1106 includes a display 1108 configured to display information and an input device 1109, such as a mouse and a keyboard, configured to input information by a user. The display 1108 and the input device 1109 are connected to the CPU 1101 by using an input/output controller 1110 of the system bus 1105. The basic I/O system 1106 may further include the input/output controller 1110, so as to receive and process input of multiple other devices such as the keyboard, the mouse, and an electronic stylus. Similarly, the input/output controller 1110 further provides output to a display screen, a printer, or an output device of another type.

The large scale storage device 1107 is connected to the CPU 1101 by using a large scale storage controller (not shown in the figure) connected to the system bus 1105. The large scale storage device 1107 and an associated computer readable medium provide non-volatile storage for the server 1100. That is, the large scale storage device 1107 may include a computer readable medium (not shown in the figure) such as a hard disk or a CD-ROM drive.

Without loss of generality, the computer readable medium may include a computer storage medium and a communication medium. The computer storage medium includes volatile and non-volatile, movable and unmovable media implemented by using any method or technology and configured to store information such as a computer readable instruction, a data structure, a program module, or other data. The computer storage medium includes a RAM, a ROM, an EPROM, an EEPROM, a flash memory, or another solid storage technology, and a CD-ROM, a DVD, or another optical storage, and a cassette, a type, magnetic storage, or another magnetic storage device. Certainly, a person skilled in the art may know that the computer storage medium is not limited to the foregoing. The system memory 1104 and the large scale storage device 1107 may be uniformly called as a memory.

According to various embodiments of the present invention, the server 1100 may run by connecting to a remote computer on a network by using a network such as Internet.

That is, the server 1100 may be connected to a network 1112 by using a network interface unit 1111 connected to the system bus 1105, or the server 1100 may be connected to a network of another type or a remote computer system (not shown in the figure) by using a network interface unit 1111.

The memory further includes one or more programs, and the one or more programs are stored in the memory, and one or more CPUs 1101 are configured to execute the programs. The one or more programs include an instruction used for performing the following operations:

receiving at least one screening condition and to-be-pushed conversion association information that are sent by a social application client corresponding to an information providing account;

obtaining at least one target pushing account from candidate pushing accounts through screening according to the at least one screening condition;

encapsulating the conversion association information into a dedicated service message corresponding to the target pushing account; and pushing the dedicated service message to a social application client corresponding to the target pushing account, so that the social application client corresponding to the target pushing account reads the conversion association information included in the dedicated service message, generates a conversion prompt identifier corresponding to the conversion association information, displays the conversion prompt identifier on an interface that is used for guiding a user of the social application client corresponding to the target pushing account to perform goods conversion, and after a triggering signal acting on the conversion prompt identifier is received, displays the conversion association information corresponding to the conversion prompt identifier.

Assuming that the foregoing is the first possible implementation manner, in a second possible implementation manner provided based on the first possible implementation manner, the memory of the server further includes an instruction used for executing the following operations:

obtaining, from all candidate pushing accounts through screening, at least one target pushing account satisfying the at least one screening condition, where the at least one screening condition includes at least one of an account key word, gender, age, region, hobby, job, constellation, and network behavior records in the social application.

In the first possible implementation manner, or a third possible implementation manner provided based on the second possible implementation manner, the memory of the server further includes an instruction used for executing the following operations:

generating an information identifier corresponding to the conversion association information; and storing a correspondence between the conversion association information and the information identifier; and the encapsulating the conversion association information into a dedicated service message corresponding to the target pushing account includes:

encapsulating the conversion association information and the information identifier into the dedicated service message corresponding to the target pushing account, where the information identifier is used for identifying the conversion association information, and after the information identifier is pushed to the social application client corresponding to the target pushing account, the information identifier is invisible to a user of the social application client corresponding to the target pushing account.

In a fourth possible implementation manner provided based on the third possible implementation manner, the memory of the server further includes an instruction used for executing the following operations:

generating one information identifier for the conversion association information;

or, generating the information identifier, having the number being equal to the number of the target pushing accounts, for the conversion association information, where each information identifier corresponds to the conversion association information and each information identifier corresponds to one target pushing account.

In a fifth possible implementation manner provided based on the third possible implementation manner, the memory of the server further includes an instruction used for executing the following operations:

receiving a conversion request carrying the information identifier and sent by the social application client corresponding to the target pushing account, where the conversion request is sent by the social application client corresponding to the target pushing account after receiving an instruction indicating confirmation of converting the conversion goods in the conversion association information;

acquiring the conversion association information corresponding to the received information identifier according to the stored correspondence between the information identifier and the conversion association information; and completing a conversion process of converting the conversion goods according to the preferential information in the conversion association information.

In a sixth possible implementation manner provided based on the fifth possible implementation manner, the memory of the server further includes an instruction used for executing the following operations:

converting an original conversion value of the conversion goods into a conversion value after reduction and exemption according to the preferential information;

subtracting the conversion value after reduction and exemption from a first value corresponding to the target pushing account; and adding the conversion value after reduction and exemption to a second value corresponding to the information providing account.

In a seventh possible implementation manner provided based on the fifth possible implementation manner, the memory of the server further includes an instruction used for executing the following operations:

subtracting the original conversion value of the conversion goods from the first value corresponding to the target pushing account;

adding the original conversion value to the second value corresponding to the information providing account; and sending, by the social application client corresponding to the information providing account, a response indicating that the conversion succeeds, where the response indicating that the conversion succeeds is used for prompting the information providing account to provide bonus goods to the target pushing account.

In conclusion, in the server provided in this embodiment, after receiving at least one screening condition and to-be-pushed conversion association information that are sent by a social application client corresponding to an information providing account, a server obtains at least one target pushing account from candidate pushing accounts through screening according to the at least one screening condition, and after the conversion association information is encapsulated into a dedicated service message corresponding to the target pushing account, pushes the dedicated service message to a social application client corresponding to the target pushing account; therefore, on one hand, compared with that in the information releasing method involved in the background of the present disclosure, information is released for all Internet users, this embodiment of the present invention can effectively control the number and quality of the target pushing accounts by using a screening condition, so that the information is pushed in a targeted and intentional manner; on the other hand, compared with that in the information releasing method involved in the background of the present disclosure, an Internet user needs to open a webpage actively to view information, in the embodiments of the present invention, information is pushed to the target pushing account actively, thereby avoiding that some users really needing to receive the information miss the information; therefore, this embodiment of the present invention solves a problem that an effective acquisition rate of information is low in the information releasing method involved in the background of the present disclosure, and achieves an effect of greatly improving an effective acquisition rate of information by actively pushing conversion association information to some specific accounts.

In addition, compared with an existing manner in which the reduction and exemption is performed through the conversion code or the conversion voucher, where the manner requires that the user manually inputs the conversion code or selects the conversion voucher in the conversion or payment process, in this embodiment of the present invention, the information identifier corresponding to the conversion association information is generated, where the conversion identifier is used for identifying the conversion association information between the server and the social application client corresponding to the target pushing account, and the information identifier is invisible to the user of the social application client corresponding to the target pushing account, so that the user corresponding to the target pushing account does not need to add or input the information identifier in the conversion or payment process, thereby reducing unnecessary steps in the conversion or payment process, and improving conversion or payment efficiency. Further, when the number of the information identifiers is equal to the number of the target pushing accounts, and each information identifier corresponds to the conversion association information and each information identifier corresponds to one target pushing account, the server can acquires, according to the information identifier, the target pushing account finally buying the related conversion goods, thereby performing related data statistics, where the data statistics is used for providing a reference when screening is performed on the target pushing account next.

Figure 12:
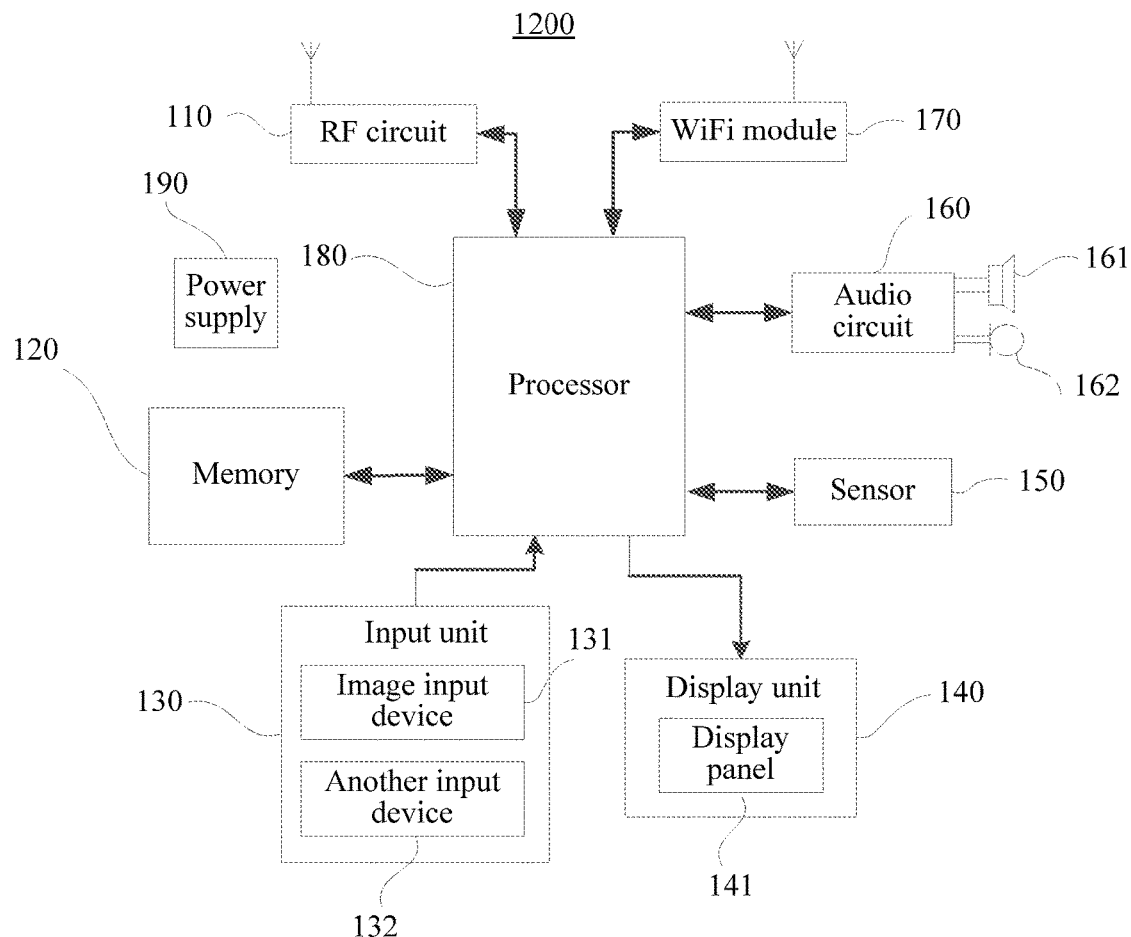
FIG. 12 is a schematic structural diagram of a terminal according to an embodiment of the present invention.

Refer to FIG. 12, which is a schematic structural diagram of a terminal according to an embodiment of the present invention. The terminal may be an information providing terminal or a target terminal. The information providing terminal may be configured to implement an information pushing method in a social application client corresponding to an information providing account in the foregoing embodiment. The target terminal may be configured to implement an information pushing method in a social application client corresponding to a target pushing account provided in the foregoing embodiment. Specifically:

The terminal 1200 may include a radio frequency (RF) circuit 110, a memory 120 including one or more computer readable storage media, an input unit 130, a display unit 140, a sensor 150, an audio circuit 160, a wireless fidelity (WiFi) module 170, a processor 180 including one or more processing cores, and a power source supply 190. A person skilled in the art may understand that, the structure of the terminal shown in FIG. 12 does not constitute a limitation to the terminal, and the terminal may include more components or fewer components than those shown in the figure, or some components may be combined, or a different component deployment may be used.

The RF circuit 110 may be configured to receive and send a signal in an information transceiving process or a conversation process, and especially, after receiving downlink information of a base station, sending the downlink information to the one or more processors 180 for processing, and in addition, sends involved uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communications standard or protocol, which includes, but is not limited to, a Global System for Mobile communications (GSM), a General Packet Radio Service (GPRS), Code Division Multiple Access (CDMA), Wideband Code Division Multiple Access (WCDMA), Long Term Evolution (LTE), e-mail, Short Messaging Service (SMS), and the like.

The memory 120 may be configured to store a software program or a module. The processor 180 runs the software program and the module that are stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 1200, and the like. In addition, the memory 120 may include a high speed random access memory, and may also include a non-volatile memory, such as at least one magnetic disk storage device, a flash memory, or another volatile solid storage device. Accordingly, the memory 120 may further include a memory controller, so that the processor 180 and the input unit 130 access the memory 120. Correspondingly, the memory 120 may further include a memory controller, so that the processor 180 and the input unit 130 access the memory 120.

The input unit 130 may be configured to receive input figure or character information, and generate input, related to the user setting and functional control, of a keyboard, mouse, joystick, optical, or track ball signal. Specifically, the input unit 130 may include an image input device 131 and another input device 132. The image input device 131 may be a camera, or an optoelectronic scanning device. In addition to the image input device 131, the input device 130 may further include another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user ports of the terminal 1200. The graphical user ports may be formed by a graph, a text, an icon, a video, and any combination thereof. The display unit 140 may include a display panel 141. Optionally, the display panel 141 may be configured by using a liquid crystal display (LCD), an organic light-emitting diode (OLED), or the like.

The terminal 1200 may further include at least one sensor 150, such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 1200 is moved to the ear. As one type of motion sensor, a gravity acceleration sensor may detect magnitude of accelerations at various directions (which generally are triaxial), may detect magnitude and a direction of the gravity when static, and may be configured to identify an application of a mobile phone gesture (such as switchover between horizontal and vertical screens, a related game, and gesture calibration of a magnetometer), a related function of vibration identification (such as a pedometer and a knock). Other sensors, such as a gyroscope, a barometer, a hygrometer, a thermometer, and an infrared sensor, which may be configured in the terminal 1200 are not further described herein.

The audio circuit 160, a loudspeaker 161, and a microphone 162 may provide audio interfaces between the user and the terminal 1200. The audio circuit 160 may transmit, to the loudspeaker 161, a received electric signal converted from received audio data. The loudspeaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal device by using the RF circuit 110, or outputs the audio data to the memory 120 for further processing. The audio circuit 160 may further include an earplug jack, so as to provide communication between a peripheral earphone and the terminal 1200.

WiFi belongs to a short distance wireless transmission technology. The terminal 1200 may help, by using the WiFi module 170, a user to receive and send an e-mail, browse a webpage, and access stream media, and the like, which provides wireless broadband Internet access for the user. Although FIG. 12 shows the WiFi module 170, it may be understood that, the wireless communications unit does not belong to a necessary constitution of the terminal 1200, and can be ignored according to demands without changing the scope of the essence of the present disclosure.

The processor 180 is a control center of the terminal 1200, and connects to various parts of the mobile phone by using various interfaces and lines. By running or executing the software program and/or module stored in the memory 120, and invoking data stored in the memory 120, the processor 180 executes various functions and data processing of the terminal 1200, thereby performing overall monitoring on the mobile phone. Optionally, the processor 180 may include one or more processing cores. Preferably, the processor 180 may integrate an application processor and a modem. The application processor mainly processes an operating system, a user interface, an application program, and the like. The modem mainly processes wireless communication. It may be understood that, the foregoing modem may also not be integrated into the processor 180.

The terminal 1200 further includes the power supply 190 (such as a battery) for supplying power to the components. Preferably, the power supply may logically connect to the processor 180 by using a power supply management system, thereby implementing functions, such as charging, discharging, and power consumption management, by using the power supply management system. The power supply 190 may further include any component, such as one or more direct current or alternate current power supplies, a recharging system, a power supply fault detection circuit, a power supply converter or an inverter, and a power supply state indicator.

Although not shown in the figure, the terminal 1200 may further include a Bluetooth module, and the like, which are not further described herein.

Specifically, in this embodiment, when the terminal 1200 is an information providing terminal, the information providing terminal further includes a memory, and one or more programs, where the one or more programs are stored in the memory, and one or more processors are configured to execute the one or more programs. The one or more programs include an instruction used for performing the following operations:

acquiring at least one screening condition; and sending the at least one screening condition and to-be-pushed conversion association information to a server, so that the server obtains at least one target pushing account from candidate pushing accounts through screening according to the at least one screening condition, and after the conversion association information is encapsulated into a dedicated service message corresponding to the target pushing account, pushes the dedicated service message to a social application client corresponding to the target pushing account.

Assuming that the foregoing is the first possible implementation manner, in a second possible implementation manner provided based on the first possible implementation manner, the memory of the information providing terminal further includes an instruction used for executing the following operations:

generating the conversion association information, where the conversion association information includes conversion goods and preferential information of the conversion goods, where the preferential information of the conversion goods is information used for converting an original conversion value of the conversion goods into a conversion value after reduction and exemption, or, the preferential information of the conversion goods is information used for providing bonus goods.

In a third possible implementation manner provided based on the second possible implementation manner, the memory of the information providing terminal further includes an instruction used for executing the following operations:

determining the at least one screening condition according to features of the conversion goods, where the at least one screening condition includes at least one of an account key word, gender, age, region, hobby, job, constellation, and network behavior records in the social application.

When the terminal 1200 is a target terminal, the target terminal further includes a memory, and one or more programs, where the one or more programs are stored in the memory, and one or more processors are configured to execute the one or more programs. The one or more programs include an instruction used for performing the following operations:

receiving a dedicated service message pushed by a server, where the dedicated service message is sent by the server to a social application client corresponding to a target pushing account after the server receives at least one screening condition and to-be-pushed conversion association information that are sent by a social application client corresponding to an information providing account, obtains at least one target pushing account from candidate pushing accounts through screening according to the at least one screening condition, and encapsulates the conversion association information into the dedicated service message corresponding to the target pushing account;

reading the conversion association information included in the dedicated service message;

generating a conversion prompt identifier corresponding to the conversion association information;

displaying the conversion prompt identifier on an interface that is used for guiding a user of the social application client corresponding to the target pushing account to perform goods conversion; and after a triggering signal acting on the conversion prompt identifier is received, displaying the conversion association information corresponding to the conversion prompt identifier.

Assuming that the foregoing is the first possible implementation manner, in a second possible implementation manner provided based on the first possible implementation manner, the memory of the target terminal further includes an instruction used for executing the following operations:

reading an information identifier included in the dedicated service message; and storing a correspondence between the conversion association information and the information identifier, where the information identifier is invisible to the user of the social application client corresponding to the target pushing account.

In a third possible implementation manner provided based on the second possible implementation manner, the memory of the target terminal further includes an instruction used for executing the following operations:

receiving an instruction indicating confirmation of converting the conversion goods in the conversion association information; and sending the conversion request carrying the information identifier to the server, so that the server acquires the conversion association information corresponding to the received information identifier according to the stored correspondence between the information identifier and the conversion association information, and completes the conversion process of the conversion goods according to the preferential information in the conversion association information.

In conclusion, in the information pushing apparatus provided in this embodiment, after acquiring at least one screening condition, a social application client corresponding to an information providing account sends the at least one screening condition and to-be-pushed conversion association information to a server, so that the server obtains at least one target pushing account from candidate pushing accounts through screening according to the at least one screening condition, and after the conversion association information is encapsulated into a dedicated service message corresponding to the target pushing account, pushes the dedicated service message to a social application client corresponding to the target pushing account; therefore, on one hand, compared with that in the information releasing method involved in the background of the present disclosure, information is released for all Internet users, this embodiment of the present invention can effectively control the number and quality of the target pushing accounts by using a screening condition, so that the information is pushed in a targeted and intentional manner; on the other hand, compared with that in the information releasing method involved in the background of the present disclosure, an Internet user needs to open a webpage actively to view information, in the embodiments of the present invention, information is pushed to the target pushing account actively, thereby avoiding that some users really needing to receive the information miss the information; therefore, this embodiment of the present invention solves a problem that an effective acquisition rate of information is low in the information releasing method involved in the background of the present disclosure, and achieves an effect of greatly improving an effective acquisition rate of information by actively pushing conversion association information to some specific accounts.

In the target terminal provided in this embodiment, after receiving a dedicated service message pushed by a server, a social application client corresponding to a target pushing account reads conversion association information included in the dedicated service message, generates a conversion prompt identifier corresponding to the conversion association information, displays the conversion prompt identifier on an interface that is used for guiding a user of the social application client corresponding to the target pushing account to perform goods conversion, and after a triggering signal acting on the conversion prompt identifier is received, displays the conversion association information corresponding to the conversion prompt identifier, where the dedicated service message is sent by the server to the social application client corresponding to the target pushing account after the server receives at least one screening condition and to-be-pushed conversion association information that are sent by a social application client corresponding to an information providing account, obtains at least one target pushing account from candidate pushing accounts through screening according to the at least one screening condition, and encapsulates the conversion association information into the dedicated service message corresponding to the target pushing account; therefore, on one hand, compared with that in the information releasing method involved in the background of the present disclosure, information is released for all Internet users, this embodiment of the present invention can effectively control the number and quality of the target pushing accounts by using a screening condition, so that the information is pushed in a targeted and intentional manner; on the other hand, compared with that in the information releasing method involved in the background of the present disclosure, an Internet user needs to open a webpage actively to view information, in the embodiments of the present invention, information is pushed to the target pushing account actively, thereby avoiding that some users really needing to receive the information miss the information; therefore, this embodiment of the present invention solves a problem that an effective acquisition rate of information is low in the information releasing method involved in the background of the present disclosure, and achieves an effect of greatly improving an effective acquisition rate of information by actively pushing conversion association information to some specific accounts.

Figure 13:
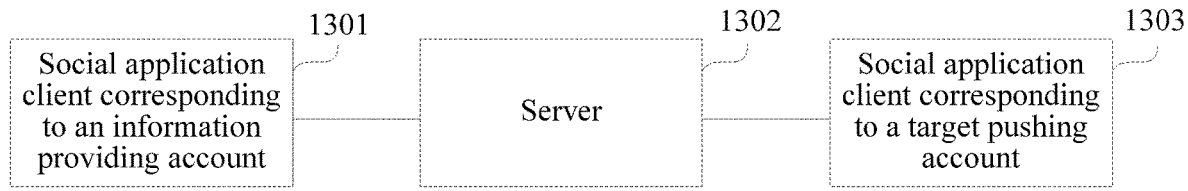
FIG. 13 is a structural block diagram of an information pushing system according to another embodiment of the present invention.

Refer to FIG. 13, which is a schematic block diagram of an information pushing system according to an embodiment of the present invention. The information pushing system includes a social application client 1301 corresponding to an information providing account, a server 1302, and a social application client 1303 corresponding to a target pushing account, where the social application client 1301 corresponding to the information providing account, the server 1302, and the social application client 1303 corresponding to the target pushing account are connected through a wired network or a wireless network, where the social application client 1301 corresponding to the information providing account is configured to acquire at least one screening condition, and send the at least one screening condition and to-be-pushed conversion association information to the server;

the server 1302 is configured to obtain at least one target pushing account from candidate pushing accounts through screening according to the received at least one screening condition, encapsulate the conversion association information into a dedicated service message corresponding to the target pushing account, and push the dedicated service message to a social application client corresponding to the target pushing account; and the social application client 1303 corresponding to the target pushing account is configured to read the conversion association information included in the received dedicated service message, generate a conversion prompt identifier corresponding to the conversion association information, display the conversion prompt identifier on an interface that is used for guiding a user of the social application client corresponding to the target pushing account to perform goods conversion, and after a triggering signal acting on the conversion prompt identifier is received, display the conversion association information corresponding to the conversion prompt identifier.

In conclusion, in the information pushing system provided in this embodiment, after receiving at least one screening condition and to-be-pushed conversion association information that are sent by a social application client corresponding to an information providing account, a server obtains at least one target pushing account from candidate pushing accounts through screening according to the at least one screening condition, and after the conversion association information is encapsulated into a dedicated service message corresponding to the target pushing account, pushes the dedicated service message to a social application client corresponding to the target pushing account; therefore, on one hand, compared with that in the information releasing method involved in the background of the present disclosure, information is released for all Internet users, this embodiment of the present invention can effectively control the number and quality of the target pushing accounts by using a screening condition, so that the information is pushed in a targeted and intentional manner; on the other hand, compared with that in the information releasing method involved in the background of the present disclosure, an Internet user needs to open a webpage actively to view information, in the embodiments of the present invention, information is pushed to the target pushing account actively, thereby avoiding that some users really needing to receive the information miss the information; therefore, this embodiment of the present invention solves a problem that an effective acquisition rate of information is low in the information releasing method involved in the background of the present disclosure, and achieves an effect of greatly improving an effective acquisition rate of information by actively pushing conversion association information to some specific accounts.

It should be noted that, unless it is clearly described that exceptional cases are supported, "one" ("a", "an", and "the") in a singular manner used in this specification intends to include the plural manner. It should also be noted that, "and/or" used in this specification refers to any one of or all possible combinations of one or more relevantly listed items.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. A promotion information pushing method performed in a social networking application, comprising:
at a server for operating a social networking platform communicatively coupled to (1) a first mobile terminal associated with a first user account of the social networking application configured to provide promotion information of an item for sale on the social networking platform and (2) a second mobile terminal associated with a target pushing account of the social networking application that is selected by the social networking platform to receive the promotion information:
receiving, from the first user account of the first mobile terminal, at least one profiling condition associated with one or more target pushing accounts for receiving the promotion information and the promotion information of the item for sale on the social networking platform;
generating an information identifier corresponding to the promotion information;
storing a correspondence between the promotion information and the information identifier wherein the information identifier is used for identifying the promotion information by the server for the second mobile terminal of the target pushing account, and the information identifier is invisible to a user of the second mobile terminal corresponding to the target pushing account;
selecting the target pushing account satisfying the at least one profiling condition from candidate pushing accounts;
encapsulating the promotion information and the information identifier into a dedicated service message corresponding to the target pushing account; and
pushing the dedicated service message to the second mobile terminal corresponding to the target pushing account, so that the second mobile terminal corresponding to the target pushing account:
reads the promotion information comprised in the dedicated service message,
generates a promotion prompt identifier corresponding to the promotion information, and
displays the promotion prompt identifier on a first user interface of the social networking application for guiding the user of the second mobile terminal corresponding to the target pushing account to view the promotion information of the item for sale;
receiving, from the second mobile terminal, a triggering signal generating in response to a user input acting on the promotion prompt identifier displayed on the first user interface of the social networking application;

in response to the triggering signal, sending, to the second mobile terminal, instruction for displaying a second user interface including promotion information of the item for sale corresponding to the promotion prompt identifier on the user interface of the social networking application;

receiving, from the target pushing account on the second mobile terminal, a request to submit an order of the item with the promotion information;

in response to the request, completing a purchase transaction of the item for sale with the promotion information between the first user account and the target pushing account in the social networking application, comprising:

subtracting a value corresponding to the item with the promotion information from a second account balance of the target pushing account stored in the social networking application; and adding the value corresponding to the item with the promotion information providing to a first account balance of the first user account stored in the social networking application.

2. The method according to claim 1, wherein the selecting the target pushing account satisfying the at least one profiling condition from candidate pushing accounts comprises:

selecting, from all candidate pushing accounts, at least one target pushing account satisfying the at least one profiling condition, wherein the at least one profiling condition comprises at least one of an account key word, gender, age, region, hobby, job, constellation, and network behavior records in the social application.

3. The method according to claim 1, wherein the generating an information identifier corresponding to the promotion information comprises:

generating one information identifier for the promotion information;

or, generating the information identifier, having the number being equal to the number of the target pushing accounts, for the promotion information, wherein each information identifier corresponds to the promotion information and each information identifier corresponds to one target pushing account.

4. The method according to claim 1, when the promotion information comprises goods and preferential information of the goods, after the pushing the dedicated service message to a social application client corresponding to the target pushing account, the method further comprises:

receiving a transaction request carrying the information identifier and sent by the social application client corresponding to the target pushing account, wherein the transaction request is sent by the social application client corresponding to the target pushing account after receiving an instruction indicating confirmation of purchasing the goods in the promotion information;

acquiring the promotion information corresponding to the received information identifier according to the stored correspondence between the information identifier and the promotion information; and completing a transaction process of purchasing the goods according to the preferential information in the promotion information.

5. The method according to claim 4, wherein when the preferential information of the goods is information used for converting an original value of the goods into a promoted value after reduction and exemption, the completing a transaction process of purchasing the goods according to the preferential information in the promotion information comprises:

converting the original value of the goods into the promoted value after reduction and exemption according to the preferential information;

subtracting the promoted value after reduction and exemption from a first value corresponding to the target pushing account; and adding the promoted value after reduction and exemption to a second value corresponding to the first user account.

6. The method according to claim 4, wherein when the preferential information of the goods is information used for providing bonus goods, the completing a transaction process of purchasing the goods according to the preferential information in the promotion information comprises:

subtracting an original value of the goods from a first value corresponding to the target pushing account;

adding the original value to a second value corresponding to the first user account; and sending, by the social application client corresponding to the first user account, a response indicating that the conversion succeeds, wherein the response indicating that the transaction succeeds is used for prompting the first user account to provide the bonus goods to the target pushing account.

7. An A server for pushing promotion information in a social networking application, the server comprising a processor coupled to a memory storing instructions for execution by the processor, and the instructions comprising:

at the server for operating a social networking platform communicatively coupled to (1) a first mobile terminal associated with a first user account of the social networking application configured to provide promotion information of an item for sale on the social networking platform and (2) a second mobile terminal associated with a target pushing account of the social networking application that is selected by the social networking platform to receive the promotion information:

receiving, from the first user account of the first mobile terminal, at least one profiling condition associated with one or more target pushing accounts for receiving the promotion information and the promotion information of the item for sale on the social networking platform;

generating an information identifier corresponding to the promotion information;

storing a correspondence between the promotion information and the information identifier, wherein the information identifier is used for identifying the promotion information by the server for the second mobile terminal of the target pushing account, and the information identifier is invisible to a user of the second mobile terminal corresponding to the target pushing account;

selecting the target pushing account satisfying the at least one profiling condition from candidate pushing accounts;

encapsulating the promotion information and the information identifier into a dedicated service message corresponding to the target pushing account; and pushing the dedicated service message to the second mobile terminal corresponding to the target pushing account, so that the second mobile terminal corresponding to the target pushing account;

reads the promotion information comprised in the dedicated service message, generates a promotion prompt identifier corresponding to the promotion information, and displays the promotion prompt identifier on a first user interface of the social networking application for guiding the user of the second mobile terminal corresponding to the target pushing account to view the promotion information of the item for sale;

receiving, from the second mobile terminal, a triggering signal generating in response to a user input acting on the promotion prompt identifier displayed on the first user interface of the social networking application;

in response to the triggering signal, sending, to the second mobile terminal, instruction for displaying a second user interface including the promotion information of the item for sale corresponding to the promotion prompt identifier on the user interface of the social networking application;

receiving, from the target pushing account on the second mobile terminal, a request to submit an order of the item with the promotion information;

in response to the request, completing a purchase transaction of the item for sale with the promotion information between the first user account and the target pushing account in the social networking application, comprising:

subtracting a value corresponding to the item with the promotion information from a second account balance of the target pushing account stored in the social networking application; and adding the value corresponding to the item with the promotion information providing to a first account balance of the first user account stored in the social networking application.

8. The server according to claim 7, wherein the instructions further comprise:

selecting, from all candidate pushing accounts, at least one target pushing account satisfying the at least one profiling condition, wherein the at least one profiling condition comprises at least one of an account key word, gender, age, region, hobby, job, constellation, and network behavior records in the social application.

9. The server according to claim 7, wherein the instructions further comprise:

generating one information identifier for the promotion information;

or, generating the information identifier, having the number being equal to the number of the target pushing accounts, for the promotion information, wherein each information identifier corresponds to the promotion information and each information identifier corresponds to one target pushing account.

10. The apparatus according to claim 7, wherein the instructions further comprises:

receiving a transaction request carrying the information identifier and sent by the social application client corresponding to the target pushing account, wherein the transaction request is sent by the social application client corresponding to the target pushing account after receiving an instruction indicating confirmation of purchasing the goods in the promotion information;

acquiring the promotion information corresponding to the received information identifier according to the correspondence between the information identifier and the promotion information; and completing a transaction process of purchasing the goods according to the preferential information in the promotion information.

11. The apparatus according to claim 10, wherein when the preferential information of the goods is information used for converting an original value of the goods into a promoted value after reduction and exemption, the instructions further comprising:

converting the original value of the goods into the promoted value after reduction and exemption according to the preferential information;

subtracting the promoted value after reduction and exemption from a first value corresponding to the target pushing account; and adding the promoted value after reduction and exemption to a second value corresponding to the first user account.

12. The apparatus according to claim 10, wherein when the preferential information of the goods is information used for providing bonus goods, the instructions further comprising:

subtracting an original value of the goods from a first value corresponding to the target pushing account;

adding the original value to a second value corresponding to the first user account; and sending, by the social application client corresponding to the first user account, a response indicating that the conversion succeeds, wherein the response indicating that the transaction succeeds is used for prompting the first user account to provide the bonus goods to the target pushing account.

13. A non-transitory computer readable storage medium storing one or more programs that, when executed by one or more processors of a server, cause the server to perform a plurality of operations including:

at a server for operating a social networking platform communicatively coupled to (1) a first mobile terminal associated with a first user account of the social networking application configured to provide promotion information of an item for sale on the social networking platform and (2) a second mobile terminal associated with a target pushing account of the social networking application that is selected by the social networking platform to receive the promotion information:

receiving, from the first user account of the first mobile terminal, at least one profiling condition associated with one or more target pushing accounts for receiving the promotion information and the promotion information of the item for sale on the social networking platform;

generating an information identifier corresponding to the promotion information;

storing a correspondence between the promotion information and the information identifier, wherein the information identifier is used for identifying the promotion information by the server for the second mobile terminal of the target pushing account, and the information identifier is invisible to a user of the second mobile terminal corresponding to the target pushing account;

selecting the target pushing account satisfying the at least one profiling condition from candidate pushing accounts;

encapsulating the promotion information and the information identifier into a dedicated service message corresponding to the target pushing account; and pushing the dedicated service message to the second mobile terminal corresponding to the target pushing account, so that the second mobile terminal corresponding to the target pushing account:
- reads the promotion information comprised in the dedicated service message,
- generates a promotion prompt identifier corresponding to the promotion information, and
- displays the promotion prompt identifier on a first user interface of the social networking application for guiding the user of the second mobile terminal corresponding to the target pushing account to view the promotion information of the item for sale;

receiving, from the second mobile terminal, a triggering signal generating in response to a user input acting on the promotion prompt identifier displayed on the first user interface of the social networking application;

in response to the triggering signal, sending, to the second mobile terminal, instruction for displaying a second user interface including the promotion information of the item for sale corresponding to the promotion prompt identifier on the user interface of the social networking application;

receiving, from the target pushing account on the second mobile terminal, a request to submit an order of the item with the promotion information;

in response to the request, completing a purchase transaction of the item for sale with the promotion information between the first user account and the target pushing account in the social networking application, comprising:
- subtracting a value corresponding to the item with the promotion information from a second account balance of the target pushing account stored in the social networking application; and
- adding the value corresponding to the item with the promotion information providing to a first account balance of the first user account stored in the social networking application.

* * * * *